(12) United States Patent
Mualla

(10) Patent No.: US 7,774,996 B2
(45) Date of Patent: Aug. 17, 2010

(54) FRICTIONAL DAMPER FOR DAMPING MOVEMENT OF STRUCTURES

(75) Inventor: Imad H. Mualla, Rodovre (DK)

(73) Assignee: Damptech APS, Lyngby (DK)

( * ) Notice: Subject to any disclaimer, the term of this patent is extended or adjusted under 35 U.S.C. 154(b) by 0 days.

(21) Appl. No.: 12/505,934

(22) Filed: Jul. 20, 2009

(65) Prior Publication Data

US 2010/0043317 A1     Feb. 25, 2010

Related U.S. Application Data

(63) Continuation of application No. 10/476,987, filed as application No. PCT/DK02/00305 on May 9, 2002, now abandoned.

(30) Foreign Application Priority Data

| May 9, 2001 | (DK) | ................................ | 2001 00728 |
| Oct. 26, 2001 | (DK) | ................................ | 2001 01579 |

(51) Int. Cl.
*E04B 1/98* (2006.01)
(52) U.S. Cl. ..................... 52/167.4; 52/167.1; 52/167.7; 52/167.8; 248/560; 248/636
(58) Field of Classification Search ................. 52/167.1, 52/167.4, 167.7, 167.8, 167.9; 248/638, 248/568–569, 602, 632, 634, 636, 566, 567
See application file for complete search history.

(56) References Cited

U.S. PATENT DOCUMENTS

| 4,633,628 A | 1/1987 | Mostaghel |
| 5,456,047 A | 10/1995 | Dorka |
| 5,456,057 A | 10/1995 | Bannon et al. |
| 5,797,228 A | 8/1998 | Kemeny |
| 5,806,250 A | 9/1998 | Medeot et al. |
| 5,915,676 A | 6/1999 | Abiru et al. |
| 6,226,935 B1 | 5/2001 | Kuramochi et al. |
| 6,966,154 B1 | 11/2005 | Bierwirth |

FOREIGN PATENT DOCUMENTS

EP     0840830 A1     5/1998

(Continued)

OTHER PUBLICATIONS

Damptech Press Release 1, XP002902607, pp. 1-2 (2000).

(Continued)

*Primary Examiner*—Jeanette Chapman
(74) *Attorney, Agent, or Firm*—Birch, Stewart, Kolasch & Birch, LLP

(57) ABSTRACT

The invention is a damper and a method for protecting buildings and similar structural systems from dynamic loading such as loading caused by earthquakes, strong winds or machine vibrations. More specifically, the damper is made from structural members being interconnected in frictional or visco-elastically dampened rotational joints. Due to the dampening of the joints, relative movement between the structural elements is dampened. In particular, the damper is useful for base isolation, e.g., in order to allow a building or a machine to move in a dampened movement relative to its foundation or in order to allow a cable stay of a cable stay bridge to move in a dampened movement relative to its fixation point on the bridge.

16 Claims, 23 Drawing Sheets

FOREIGN PATENT DOCUMENTS

Figure 1:
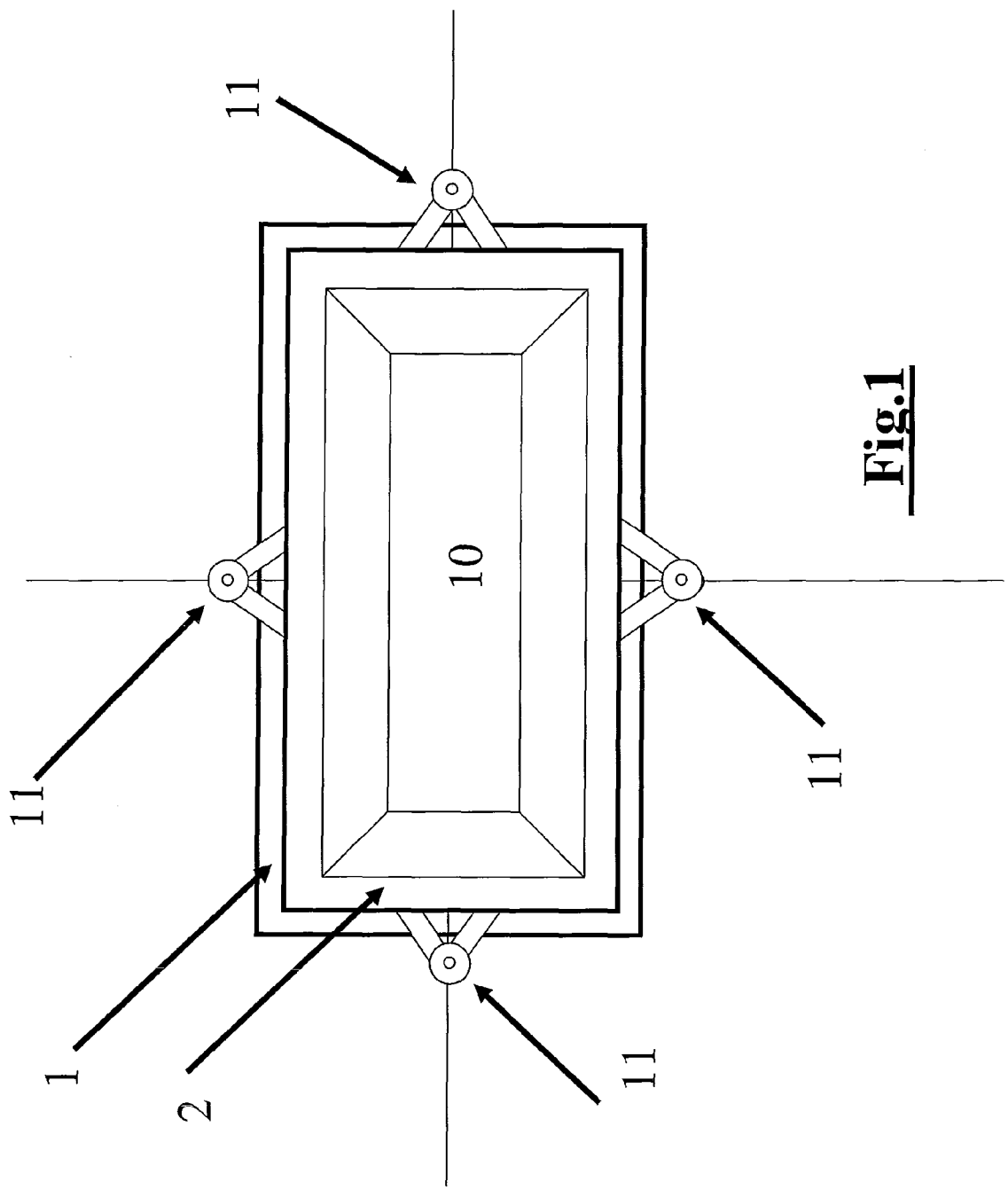

| | | |
|---|---|---|
| JP | 8 218682 | 8/1996 |
| JP | 9 133180 | 5/1997 |
| JP | 10 169244 | 6/1998 |
| JP | 11 229601 | 8/1999 |
| JP | 11 344073 | 12/1999 |
| JP | 2000 034847 | 2/2000 |
| JP | 2000 248775 | 9/2000 |
| JP | 2001 132262 | 5/2001 |
| JP | 2001 342749 | 12/2001 |
| KR | 1999-0035758-A A | 5/1999 |
| WO | WO 97/04193 A1 | 2/1997 |
| WO | WO-01/09466 A1 | 2/2001 |

OTHER PUBLICATIONS

Damptech Press Release 2, XP002902608, pp. 1-2 (2000).
Damptech Press Release 3, XP002902609, pp. 1-4 (2000).

Mechanism of the Friction Damper

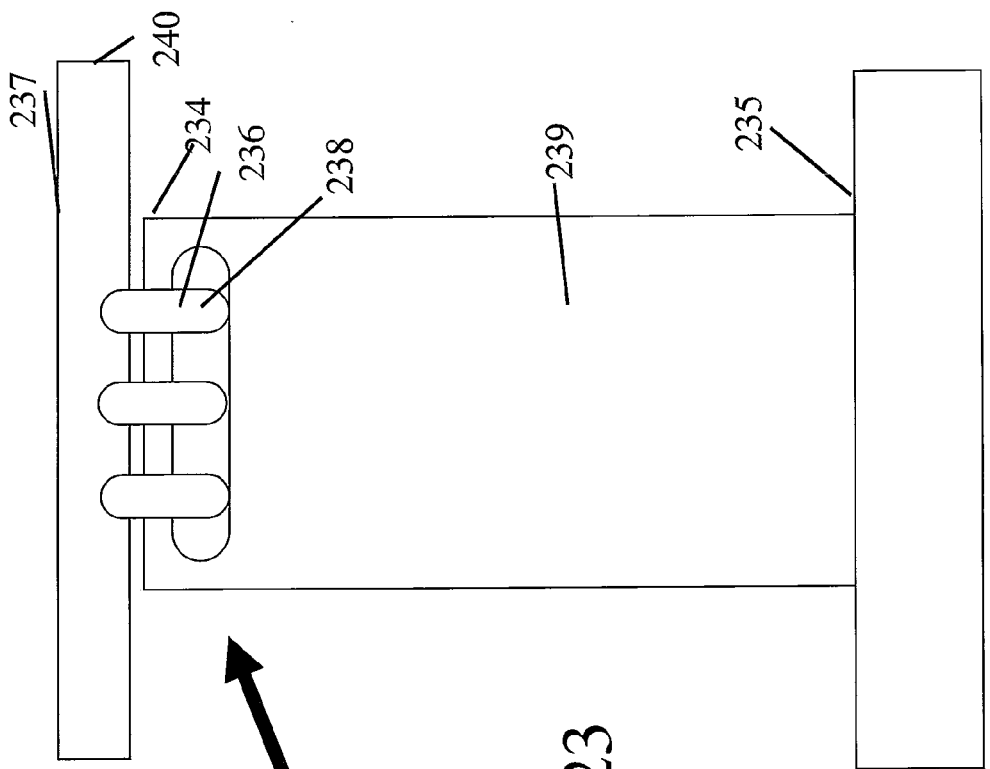
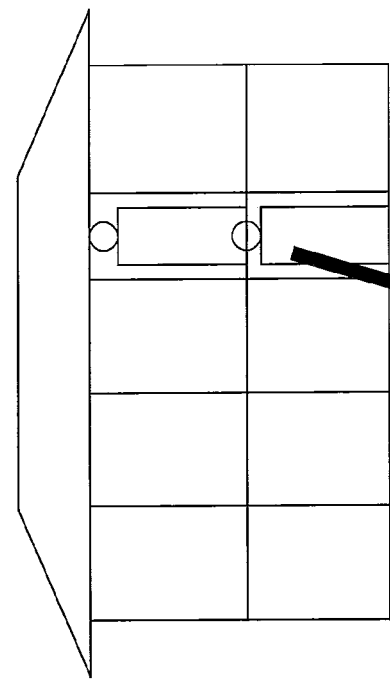
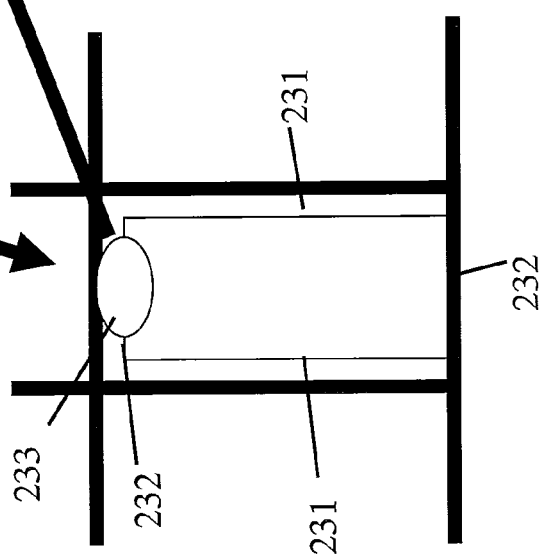
Fig. 23

FRICTIONAL DAMPER FOR DAMPING MOVEMENT OF STRUCTURES

CROSS REFERENCE TO RELATED APPLICATIONS

This application is a Continuation of application Ser. No. 10/476,987 filed Feb. 9, 2004, now abandoned and for which priority is claimed under 35 U.S.C. §120. Application Ser. No. 10/476,987 is the national phase of PCT International Application No. PCT/DK02/00305 filed on May 9, 2002 under 35 U.S.C. §371. The entire contents of each of the above-identified application are hereby incorporated by reference. This application also claims priority of Application Nos. 2001-00728 and 2001-01579 filed in Germany on May 9, 2001 and Oct. 26, 2001.

TECHNICAL FIELD

This invention generally relates to the protection of structural systems against dynamic loading such as loading caused by earthquakes or caused by impact from oceanic waves, vibrations from traffic, machines or impact of the wind. More specifically the invention relates of substantially horizontal movement of structures and in particular to the dampening of torsion in building structures.

BACKGROUND OF THE INVENTION

When a structural member is excited by a horizontal external force, torsion or similar horizontal movement may occur. Torsion, especially in high building structures or towers may have serious impact on the conditions of the structure or even result in a collapse.

Dampers play an important role in the protection of structures, e.g. houses or similar building structures, and they exist in numerous variants. Dampers are typically dampening the motion by means of a frictional force between two moving parts attached between structural members of the building or by means of a fluid being pressed to flow between two chambers through a restricted tube. Some dampers are actively changing the dampening effect corresponding to external conditions, and other dampers are passive produce and even more costly to assemble into a structural member of a building. Typically a building have to be designed for a specific damper, either due to the bulky design of the existing dampers or due to correlation between the structural characteristics of the damper versus the characteristics of the building.

Typically the existing dampers are adapted to individually dampen movement of the vertically mounted structural members of building structures. This result in the dampening of the movement of individual parts of the building in relation to other parts of the same building, which dampening may protect e.g. a building from collapsing. However, if the entire building is moved horizontally, e.g. rotationally, the building may be damaged severely, even though the individual structural members of the building is being dampened individually. Horizontal movement may occur e.g. if the foundation of a building is displaced by an earthquake or by similar vibrations transmitted through the ground.

DESCRIPTION OF THE INVENTION

It is an object of the present invention to provide a damper for dampening substantially horizontal movement or torsion in structures such as torsion in buildings. It is a further object to provide a damper which is based on a very simple design and comprises parts that are easily produced and assembled as well as easy to retrofit into existing structures as well as to fit into new structures. The present invention further provides a price efficient damper with a reliable dampening effect.

According to a first aspect, the present invention relates to a device for dampening the relative movement of a first structural member in relation to a second structural member, the first structural member being rotationally joined to at least two elements of a first group of elements, and the second structural member being rotationally joined to at least two elements of a second group of elements, wherein each of the elements of the first group of elements are individually joined to an element of the second group of elements in a rotational joint, so as to form at least four rotational joints for dampening relative movement between the elements of the first group of elements and the elements of the second group of elements and thus for dampening the movement of the first structural member in relation to the second structural member.

The first structural member and/or the second structural member may as an example be structural frames comprising e.g. three or four beams joined to form a triangle or a quadrangle. The structural members may serve for supporting a building structure, e.g. a house or in a multi-story building e.g. as a part of the foundation of the building and/or sandwiched into in a certain level of the building, e.g. for dampening the top of the building. As an example a water tank or machine may be placed on the roof of large buildings, attached to the building through a damper. As an example fire fighting equipment, swimming pools, air conditioners, ventilation systems etc, may be mounted to the building in such a way. As another example, a building may fastened to its foundation through a damper.

The two structural members may preferably be provided in the form of two steel structural members. E.g. 4 bars of steel welded together so as to form an open quadrangle. One of the quadrangles serving for attachment of the structure or building and the other is attached to the foundation. The structural members could also be made from concrete elements. The damper is integrated in the building structure by attaching the first structural member to one part of the building structure and the other structural member to another part of the building structure. As an example, a solid concrete foundation is moulded into the ground, and the first structural member—a quadrangle made of steel profiles is integrated in—or attached to the upper part of the foundation, e.g. by bolts.

The second structural member is attached to the first structural member through the two sets of elements, rotationally interconnected in a joint. The second structural member is then again attached to the rest of the building structure, e.g. bolted to a steel building structure, or the building structure is simply arranged on top of the second structural member, held in place by its weight. The weight of the building structure thereby rests on top of the second structural member. The weight of the building structure may as an example be carried by concrete blocks slidingly supporting the second structural member.

The damper may further comprise clamping means for clamping the rotational joints together, so as to maintain a clamping force between elements in the rotational joints. The clamping means may be constituted by a pin or bolt extending through two elements and thus forms a rotational joint therein between or the rotational joint may be formed in any other way, e.g. like an axial ball-bearing wherein the two elements of the bearing is held together by a locking engagement between each of the two elements and a mutual element such as a ball. The corresponding joints between the elements and the structural members may likewise be formed with a through-going pin or in any similar way, e.g. like an axial ball bearing.

At least one of the rotational joints or all of the rotational joints may be provided with at least one dampening member. The dampening member may be constituted by one or more pieces of a material which dampens the mutual movements between the joined elements, e.g. between the structural frame and one of the elements of the first or second group of elements or between two elements of the first or second group of elements.

According to a preferred embodiment, at least one dampening member is arranged between the elements of the first group of elements and the elements of the second group of elements so as to establish contact between the elements and the dampening member so that the relative movement of the elements is dampened.

According to another preferred embodiment, the at least one dampening member is arranged between the first structural member and the elements of the first group of elements and/or the elements of the second group of elements so as to establish contact between the elements and the dampening member and between the structural member and the dampening member so that the relative movement of the elements in relation to the structural member is dampened.

According to another preferred embodiment, the at least one dampening member is arranged between the second structural member and the elements of the first group of elements and/or the elements of the second group of elements so as to establish contact between the elements and the dampening member and between the structural member and the dampening member so that the relative movement of the elements in relation to the structural member is dampened.

The dampening member may comprise one or more pieces of a friction material and/or one or more pieces of a visco-elastic material. Through the contact between the material and the elements of a joint, the mutual movement of those elements is dampened either by the friction or by the viscosity of the material.

As an example, the device may comprise a frictional pad arranged between the two elements as a part of the rotational joint. The frictional pad may be arranged between the elements in a sandwich fashion. The frictional pad provides a dry frictional lubrication and is intended to maintain a mainly constant frictional coefficient. At the same time the frictional pad is intended to dampen the grinding noise prevailing from the frictional movement of the elements. Similarly, frictional pad material may be arranged in the joints where the elements are rotationally attached to the structural members.

In a similar fashion, the at least one dampening member may comprise a piece of a visco-elastic material. The visco-elastic material may preferably be selected from the group consisting of rubber, acrylic polymers, copolymers, any glassy substances, and any visco-elastic materials such as 3M visco-elastic materials or in general, any material which dissipate energy when subjected to shear deformation.

The dampening of the movement arises from the relaxation and recovery of the polymers network after it has been deformed.

In order to separate more pieces of visco-elastic or friction material respectively, a piece of a third material may be arranged between the at least one dampening member and the elements of the first group of elements or between the at least one member and the elements of the second group of elements. The third material could be a low friction material such as Teflon or nylon. Moreover, if one of the joints is provided with more than one dampening members, a piece of the third material may be arranged between two of these dampening members in at least one of the rotational joints.

According to a preferred embodiment, the piece of visco-elastic material is arranged in at least one of the joints between the first structural member and one of the at least two elements of the first group of elements. The piece of friction material may then be arranged in at least one of the joints between elements of the first group of elements and elements of the second group of elements. In that way, the friction material and the visco-elastic material is kept completely separated in different joints of the dampening device.

The separation between the visco-elastic material in one of the joints and the friction material in another one of the joints has the advantage, that the dampening characteristics may easily be changed. As an example, the one and maybe only joint purely provided with visco-elastic material may be prevented from rotating by a locking arrangement. In that way the damper changes from dampening with a combined visco-elastic and frictional characteristics to dampening with a purely frictional characteristics. The opposite situation is also applicable, i.e. that one joint provided purely with frictional material is prevented from rotation by a locking arrangement.

The device may furthermore comprise means adapted to vary the clamping force. By varying the clamping force, the frictional force and thereby the dampening characteristic is changed and can thus be adapted for a specific purpose, e.g. to match the movement of a certain wind force, earthquake etc. The means for varying the clamping force could be an electro-mechanic, electro-hydraulic, pneumatic or similar mechanically or electrically controlled device enabling dampers in a building to be actively adjusted to actual conditions.

In a preferred embodiment of the invention, the joint comprises a pin extending through each of the elements in the rotational joints. The pin can act as the only element holding the joints together and thus provide for easy fitting of the damper and adjustment of the dampening effect. The frictional movement between the elements or alternatively between the frictional pad arise from rotation of the elements around the pin, which thus acts like a hinge pin.

In a preferred embodiment of the invention the device may comprise a bolt, where at least a portion of the bolt constitutes the pin, the bolt having:

a bolt element with a bolt head, a nut with a nut head, the clamping force being determined by the pretension of the bolt. This is a simple and reliable embodiment of the invention, where only simple tools are necessary for the assembly of the device as well as for the adjustment of the clamping force.

The device may further comprise means for maintaining a substantially constant clamping force over time. This is essential, since the frictional force is a function of the clamping force and since the frictional force is adjusted to match the dampening conditions.

The means for maintaining a substantially constant clamping force may comprise at least one spring arranged between the bolt head and a surface of one of the elements and/or between the nut head and a surface of one of the elements. The spring may preferably be a disc spring or more disc springs arranged in series or it could be one or more disc spring(s) arranged between the bolt head and a surface of one of the elements, and another disc spring or more disc springs arranged between the nut head and a surface of another of the elements.

According to a preferred embodiment of the invention, at least one frictional pad is arranged between at least one of the elements of at least one of the joints and at least one joint plate. As an example, the joint may be made by applying a bolt though an element from the first group of elements, a shim or metallic plate, a circular pad material and an element from the second group of elements. All parts being pressed together by the bolt and thus providing a frictional resistance against the rotation of one of the elements in relation to the other one of the elements of that joint.

The friction pad may preferably be made of brass, aluminum or any alloys comprising brass or aluminum or composites of plastics and fibres of glass, carbon, kevlar or similar or composites of any ceramics materials and fibres of glass, carbon, kevlar or similar. Many of such compositions may be known e.g. from materials for clutches or brakes.

The frictional pad is intended to maintain a constant frictional force over a period of time and even after many cycles of movement. Such materials are readily available on the market, produced e.g. for the purpose of transferring frictional forces in brakes or clutches.

It has been found, that a device wherein the shim or metallic plate or plates and the elements are made of steel, anti-corrosive steel or brass is suitable but other materials are adaptable such as aluminum or any alloys comprising aluminum or any other steel material or composite of steel and plastics or composites of plastics and fibres of glass, carbon, Kevlar™ or similar or composites of any ceramics materials and fibres of glass, carbon, Kevlar™ or similar.

Preferably, the clamping force shows a variation of less than 10% such as 8% or even less than 7% such as 5% in a long term test, such as a 200-1000 cycle test such as a 300 cycle test with 0.2-1 Hz forcing excitement frequency such as 0.5 Hz forcing excitement frequency and a rotation amplitude of one of the at least two elements of 0.01-0.22 rad such as 0.20 at an applied moment force of +10.000 KN·mm to −10.000 KN·mm such as +/−1700 KN·mm. and an initial clamping force of 1-100 KN such as 42 KN. In a specific test (cf. the below discussion of experimental results, the variation was 5% in a 300 cycle test).

It is preferred that the relationship between displacement amplitude of one of the at least two elements of a joint and energy dissipation in the frictional joint is substantially linear. This makes the damper easier to model and thereby easier to design for a specific purpose.

According to a second aspect, the present invention relates to a device for dampening movements of structural and non structural elements in civil engineering structures, the device comprising:
at least two members,
a piece of a visco-elastic material arranged between and in contact with the at least two members in a joint for visco-elastic dampening of relative movement between the at least two members,
clamping means for clamping the at least two members together, so as to provide a clamping force applying a compressive force against the visco-elastic material, and
means for connecting each of the at least two members to respective ones of the structural elements.

The visco-elastic material may preferably be selected from the group consisting of rubber, acrylic polymers, copolymers, any glassy substances, and any visco-elastic materials such as 3M visco-elastic materials or in general, any material which dissipate energy when subjected to shear deformation.

The dampening of the movement arises from the relaxation and recovery of the polymers network after it has been deformed.

The structural element in civil engineering could be beams, columns and slabs, e.g. of a building structure such as a house. The wall which is dampened by the damper may comprise a combination of structural elements as well as non structural elements, and consequently the damper may dampen the movement of both structural and non structural elements. The non structural elements could be windows, doors, infill walls such as brick walls, panels and partition walls.

Accordingly:
The damper device can be mounted in 2 or more directions e.g. in a several story building.
The damper device can be mounted in reinforced concrete frame structures with or without walls.
The damper device can be mounted in large panel walls to reduce their sliding failure mechanism. The panels would typically be made from concrete but they may be made from other material such as timber, steel or composite materials.
The damper device can be mounted in elevated water tanks to reduce their vibration response.
The damper device can be mounted in bridges and elevated highways. It can be installed in two directions to reduce the response. As an example a number of dampers may be arrange in a first direction and a number of dampers may be arranged in a second direction. The dampers in the first direction may be provided with a dampening structure, which is different from the dampening structure of the dampers arranged in the second direction.
The damper device can be used to reduce the vibration caused by elevated machines, which are mounted on a frame structure.
The damper device can be mounted in many kinds of offshore structures to reduce their vibration response due to wave loads, e.g. from water or wind.
The damper device can be mounted in ready-made garages.
The damper device can be mounted in portable metal tents for dampening the movements of the carrying columns and beams of the tent.
The damper device can be used to reduce the rotation of joints in frame structures.
The damper device can be mounted in several story industrial buildings.
The damper device can be mounted in timber frame structures.
The damper device can be mounted in metal towers.
The damper device can be mounted in one, or multiple story houses.
The damper device can be mounted in cables of suspension bridges or cable stay bridges.
The damper device can be mounted in cables in pretension structures, e.g. stadiums or large halls, e.g. the Millennium Hall in London.
The damper device can be mounted in large panels of glass that used in the facade of glazing buildings.
The damper device can be mounted in floors to damp the floor vibration caused by human or machines.
The damper device can be mounted in pipes that transferring fluids which cause some vibration through the fluid movements.
The damper device can be mounted in Oil, Gas, liquids, fuel tanks
The damper device can be mounted in roof ceilings that hold a false ceilings or heavy chandelier.
The damper device can be mounted in museums, e.g. underneath a table or a platform holding a statue etc.
The damper device can be mounted behind many types of furniture, e.g. cupboards.

The damper device can be mounted behind shelves which are used to store parts in factories or store houses.

When the damper dampens movement, the at least two members are brought from a mutually original position to a mutually displaced position wherein at least one of the at least two members are rotated in relation to the other(s) of the at least two members. The damper could further be provided with means for bringing the at least two members back to the original position. As an example, a spring or a set of springs may be provided between the members. The springs should have sufficient strength to ensure that the members, after being displace from the original position, are drawn back to the original mutual position. The spring or set of springs may e.g. be constituted by (a) clock-spring(s), (a) compression spring(s), (a) torsion spring(s) or (a) rotational-spring(s) or any combination of the mentioned springs.

According to a preferred embodiment of the invention the damper is adapted for dampening the movement of prefabricated panels or walls made of timber or light weight metal frames such as frames made from a light weight steel alloy. The panels could as an example be made in a panel factory and be pre-mounted with the damper. The dampers could either be pre-adjusted for a specific use of the panel or the dampers could be adjusted at a later stage when they are mounted, e.g. in a residential structure.

The nature of the damper enables the use of the damper both in existing structures as well as in new structures due the simplicity of the concept.

As movement in the damper starts, the visco-elastic material will deform elastically and thus dampen the movement. As the amplitude of the movements may raise to a limit where the friction forces can not resist the applied forces, then sliding starts.

It may be preferred to combine the visco-elastic material with one or more pieces of a friction material arranged between the two members and/or between one or more pieces of the visco-elastic material arranged between the two members. The friction material provides a dry frictional lubrication and intends to maintain a mainly constant friction coefficient when the pieces of material arranged between the two members starts to slip.

The device may further comprise pieces of a third material arranged between the pieces of visco-elastic materials and/or the pieces of friction material. As an example, pieces of brass or similar metals may provide an excellent dry lubrication for the frictional movement between the different pieces.

The device may furthermore comprise means adapted to vary the clamping force. By varying the clamping force the frictional force and thereby the dampening characteristic is being changed and can thus be adapted for a specific purpose, e.g. to match the movement of a certain wind force, earthquake etc. The means for varying the clamping force could be an electro-mechanic, electro-hydraulic, pneumatic or similar mechanically or electrically controlled device enabling dampers in a building to be actively adjusted to actual conditions.

According to a preferred embodiment of the present invention, one or more pieces of a piezoelectric material is inserted between the two members. The piezoelectric elements may be inserted anywhere and in contact with any of the other inserted elements. By application of an electrical voltage to the elements, the size of the elements and thus the clamping force may be varied.

In a preferred embodiment of the invention the joint comprises a pin extending through each of the at least two members. The pin can act as the only member holding the damper together and thus provide for a easy fitting of the damper and adjustment of the dampening effect. The frictional movement between the members or alternatively between the frictional pad arise from rotation of the members around the pin, which thus acts like a hinge pin.

In a preferred embodiment of the invention the device may comprise a bolt, where at least a portion of the bolt constitutes the pin, the bolt having:
 a bolt member with a bolt head,
 a nut with a nut head, the clamping force being determined by the pretension of the bolt. This is a simple and reliable embodiment of the invention, where only simple tools are necessary for the assembly of the device as well as for the adjustment of the clamping force.

The device may further comprise means for maintaining a substantially constant clamping force over time. This is essential, since the frictional force is a function of the clamping force and since the frictional force is adjusted to match the dampening conditions.

The means for maintaining a substantially constant clamping force can comprise at least one spring arranged between the bolt head and a surface of one of the members and/or between the nut head and a surface of one of the members. The spring can preferably be a disc spring or more disc springs arranged in series or it could be one or more disc spring(s) arranged between the bolt head and a surface of one of the members, and another disc spring or more disc springs arranged between the nut head and a surface of another of the members. Preferably, a washer is placed between the disc spring(s) and the surface of the members. The washer should be adapted to uniformly distributed the pressure over there the friction or viscoelastic pads. The washer could be a hard steel disc with a thickness allowing the washer to sustain the pressure from the nut or bolt substantially without deforming. By the introduction of a washer, members with a lower wall thickness may be chosen and accordingly, the weight of the damper may be reduced.

In a preferred embodiment of the invention, the at least two members comprise a side plate and a central plate extending in substantially parallel planes. The side plate could preferably be arranged in either fixed or pivotal connection with one of the braces of the bracing system, the brace being connected fixed or pivotally to a member of the frame structure at the other end. The central plate is attached fixed or pivotally to one of the members of the frame structure, so as respectively to prevent or allow relative rotational movement between the central plate and the structural element. In this setup the pieces of visco-elastic and/or frictional material(s) can preferably be arranged between the side plate and the central plate and thus provide a visco-elastic dampening or friction between these plates. In a further preferred embodiment, two side plates are accomplishing the central plate, each being arranged symmetrically around the central plate. Each of the two side plates are connected pivotally or fixed to one of the structural members or to a brace of the bracing system, the braces are either fixed to or pivotally connected to members of the frame structure at the other end. In this setup it is preferred to adapt two pieces of visco-elastic material or pieces friction material, each piece being arranged between a respective one of the side plates and the central plate.

The friction material is intended to maintain a constant frictional force over a period of time and even after many cycles of movement. It has been found, that a friction material selected from the group consisting of: steel, anti-corrosive steel, brass, aluminum and any alloys comprising aluminum and any other steel material and composites of steel and plastics and composites of plastics and fibres of glass, carbon, kevlar and composites of any ceramics materials and fibres of glass, carbon or kevlar are preferred.

Similarly, the third material may preferably a material or a composition of materials selected from the group consisting of: steel, anti-corrosive steel, brass, aluminum and any alloys comprising aluminum and any other steel material and composites of steel and plastics and composites of plastics and fibres of glass, carbon, kevlar and composites of any ceramics materials and fibres of glass, carbon or kevlar.

Furthermore it has been found that the side plates and/or the central plate may preferably be made of steel, anti-corrosive steel or brass is suitable but other materials are adaptable such as aluminum or any alloys comprising aluminum or any other steel material or composite of steel and plastics or composites of plastics and fibres of glass, carbon, kevlar or similar or composites of any ceramics materials and fibres of glass, carbon, kevlar or similar.

Preferably the bracing system comprises any of the features of the damper according to the present invention. The device for dampening could preferably comprise at least two side plates as earlier mentioned and which are interconnected at least one of their ends by means of an interconnecting element, and wherein a brace is mounted to the interconnecting element. In a further preferred embodiment at least one of the side plates are being interconnected to one of the structural elements by means of a brace, and wherein the central plate is connected or mounted to another one of the structural elements. Furthermore at least one of the side plates could be connected to one of the structural elements by means of two braces, the two braces being connected to opposite ends of the side plate(s), and wherein the central plate is connected or mounted to another one of the structural elements.

The bracing system can be arranged with the side plates being connected to one of the structural elements by means of two braces and the damper being arranged in a V-shaped bracing. In some technical literature this kind of bracing is referred to as being an invert-V bracing or a Chevron Bracing. Similarly the bracing system can be arranged with at least one of the side plates being connected to one of the structural elements by means of two braces and the damper being arranged in a D-shaped bracing, and similarly the bracing system can be arranged with at least one of the side plates being connected to one of the structural elements by means of two braces and the damper being arranged in a K-shaped bracing. The choice of arrangement may depend on the actual situation and will be selected by a professional designer.

DETAILED DESCRIPTION OF THE INVENTION

Figure 2:
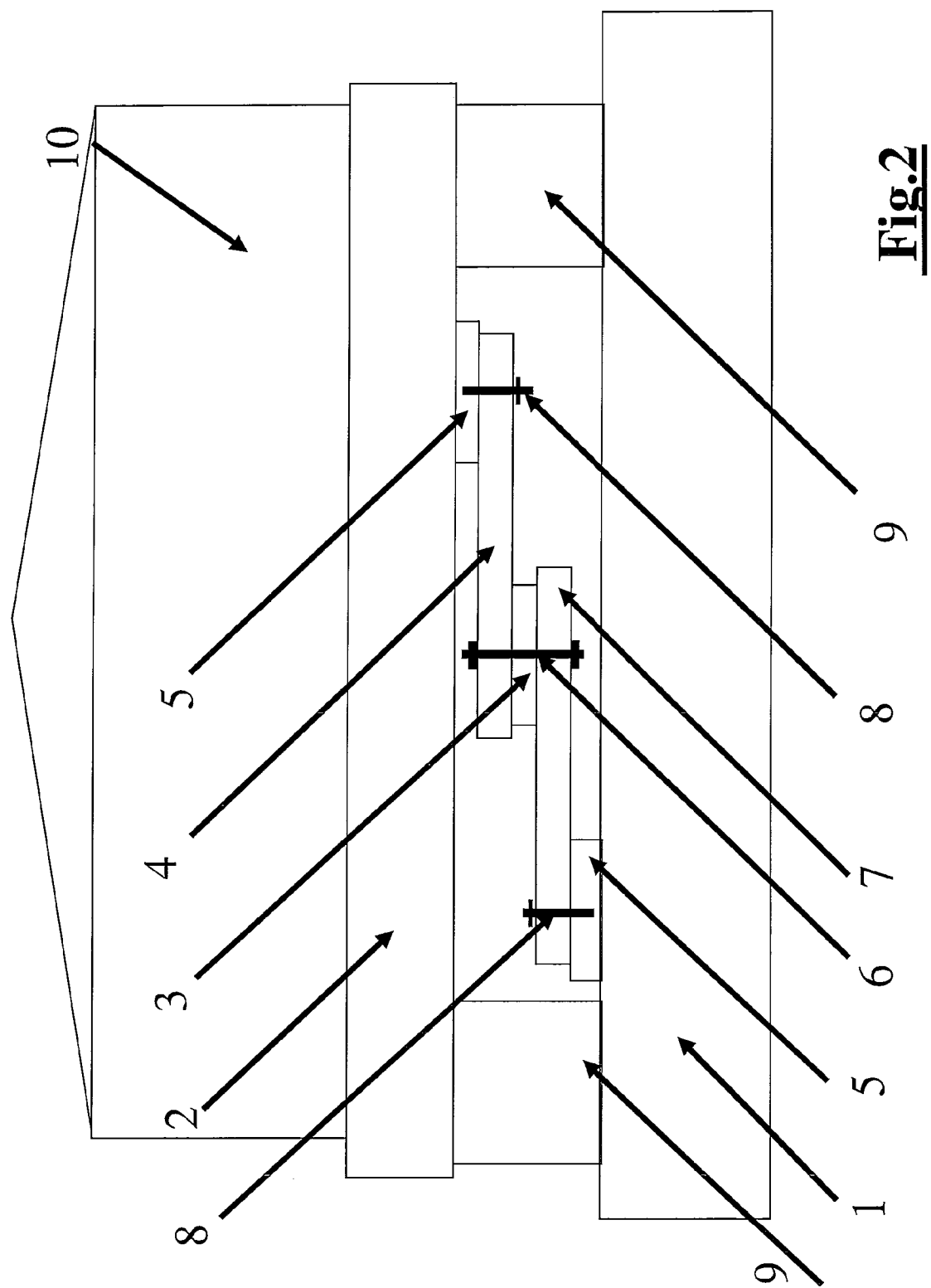
Figure 3:
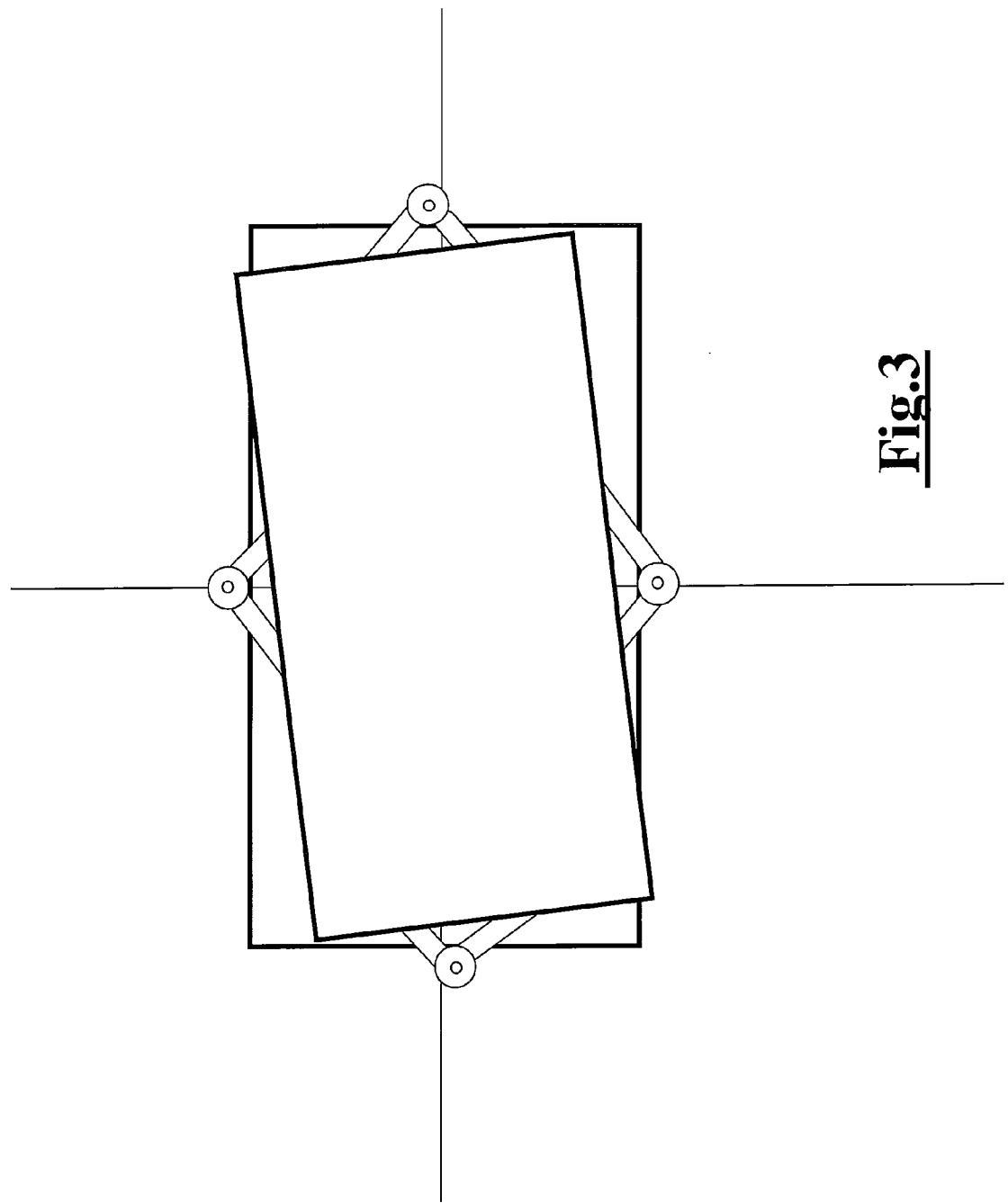
Figure 4:
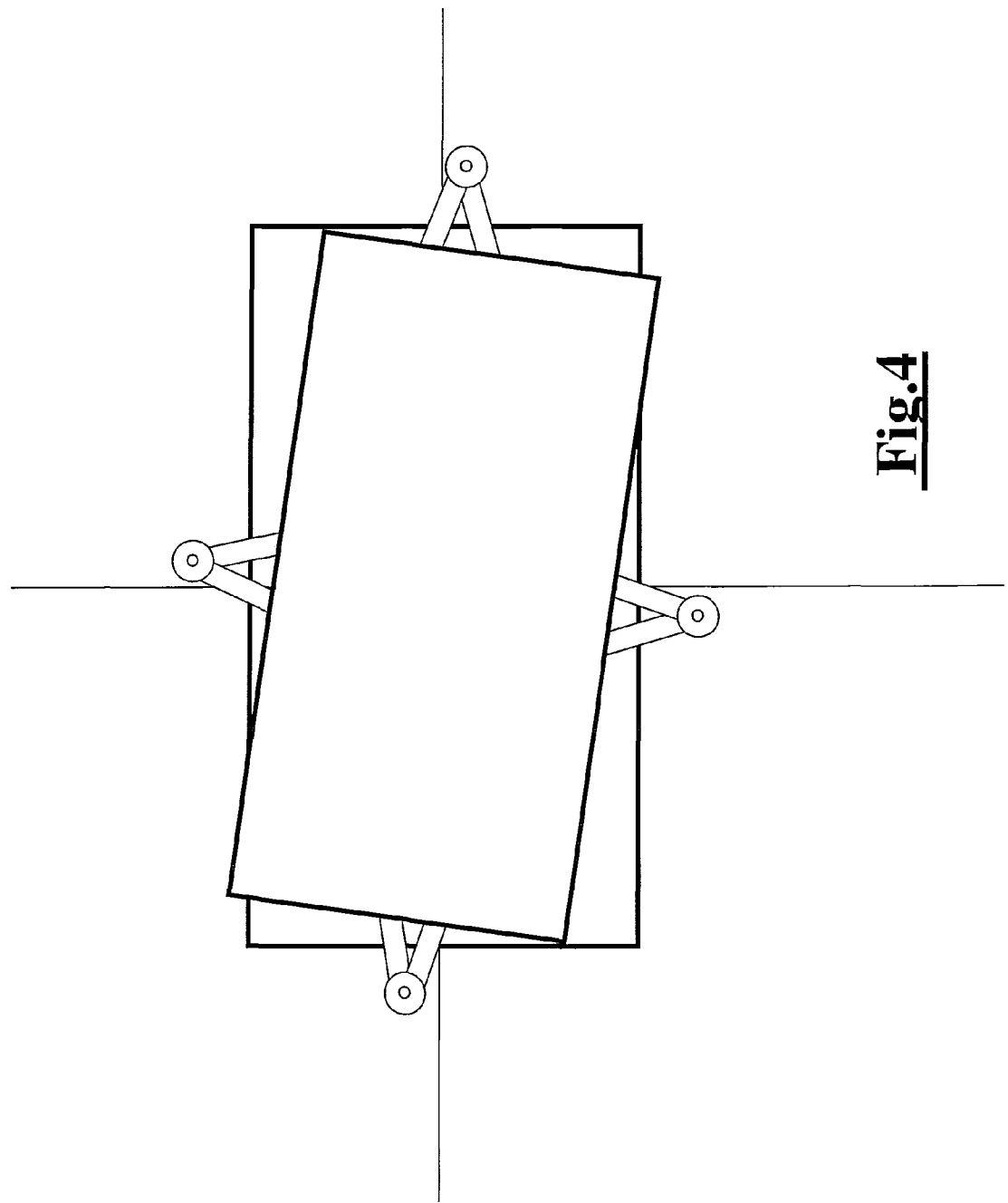
Figure 5:
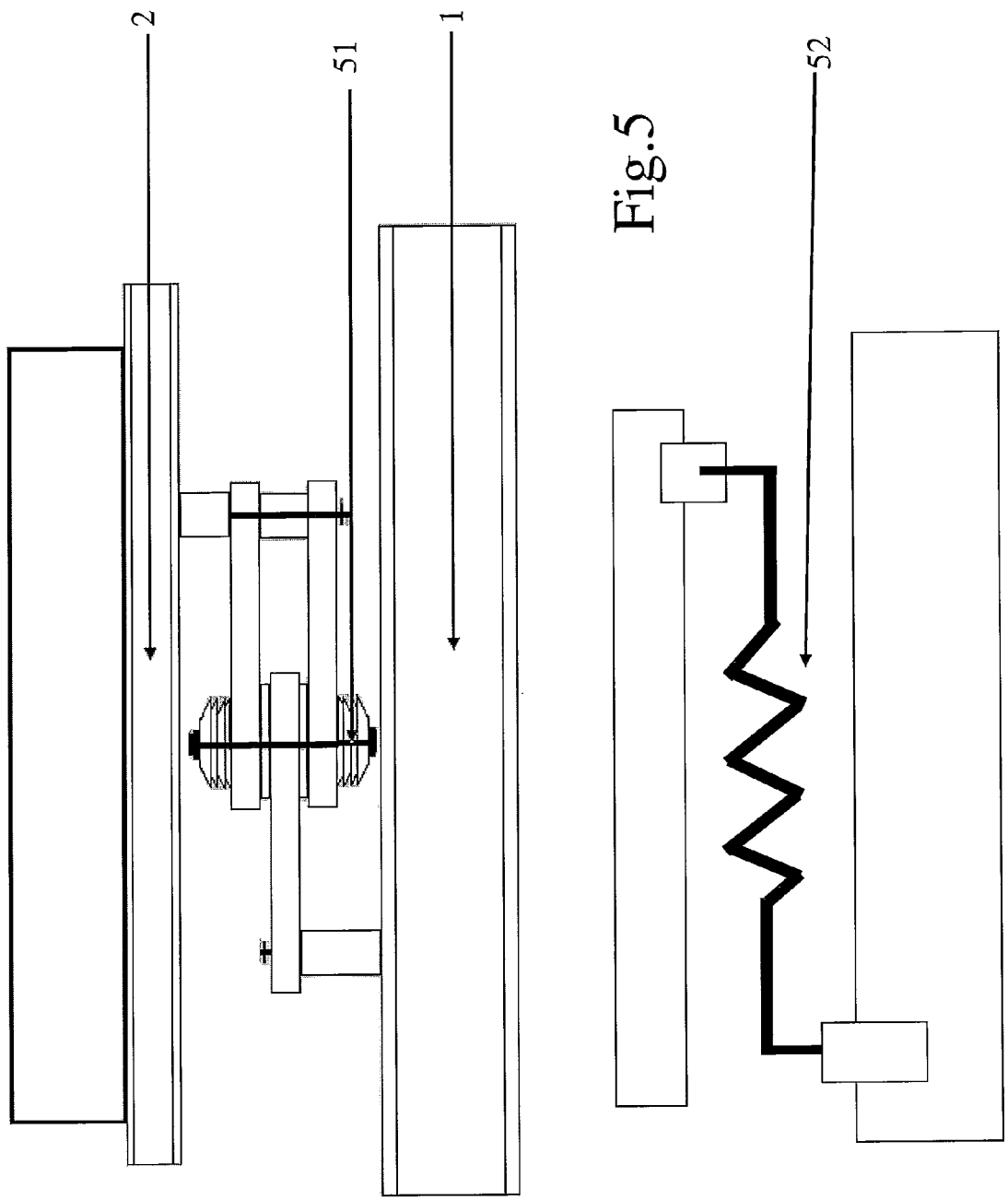
Figure 6:
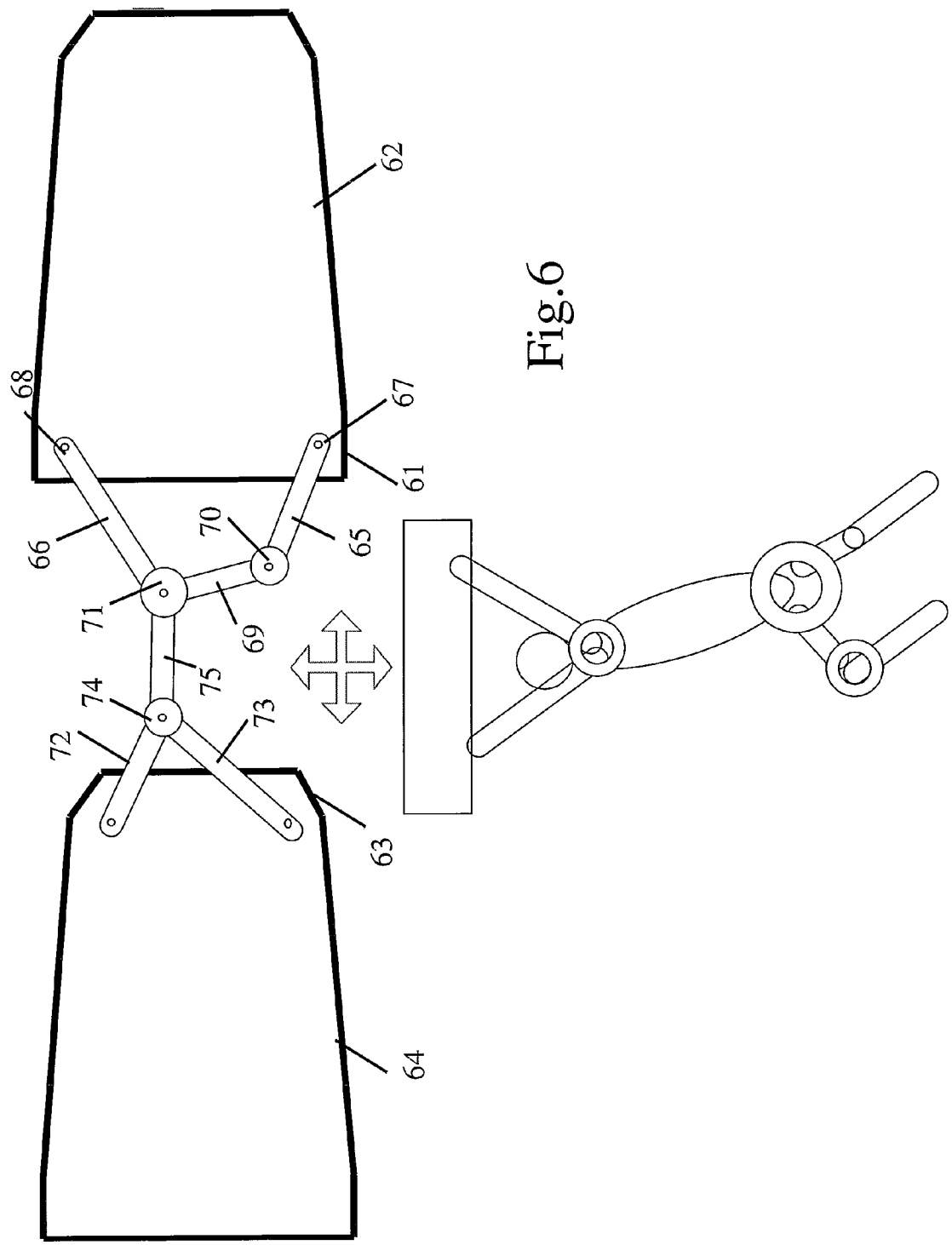
Figure 7:
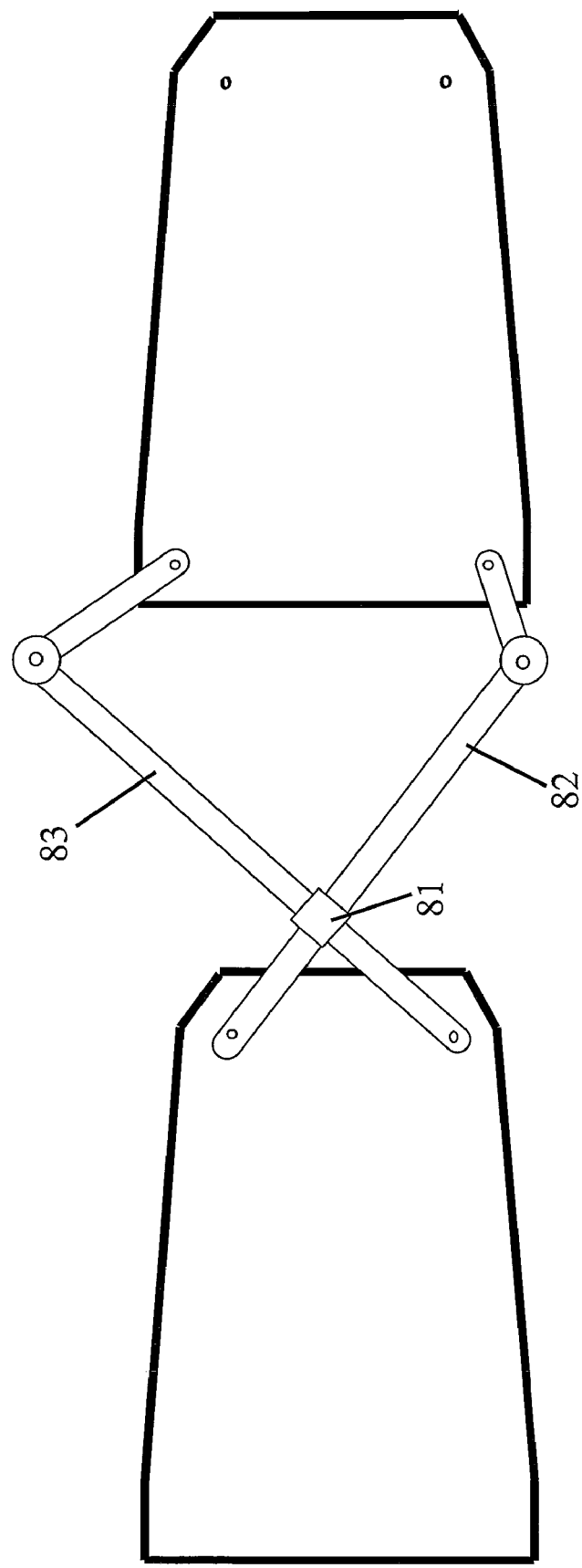
Figure 8:
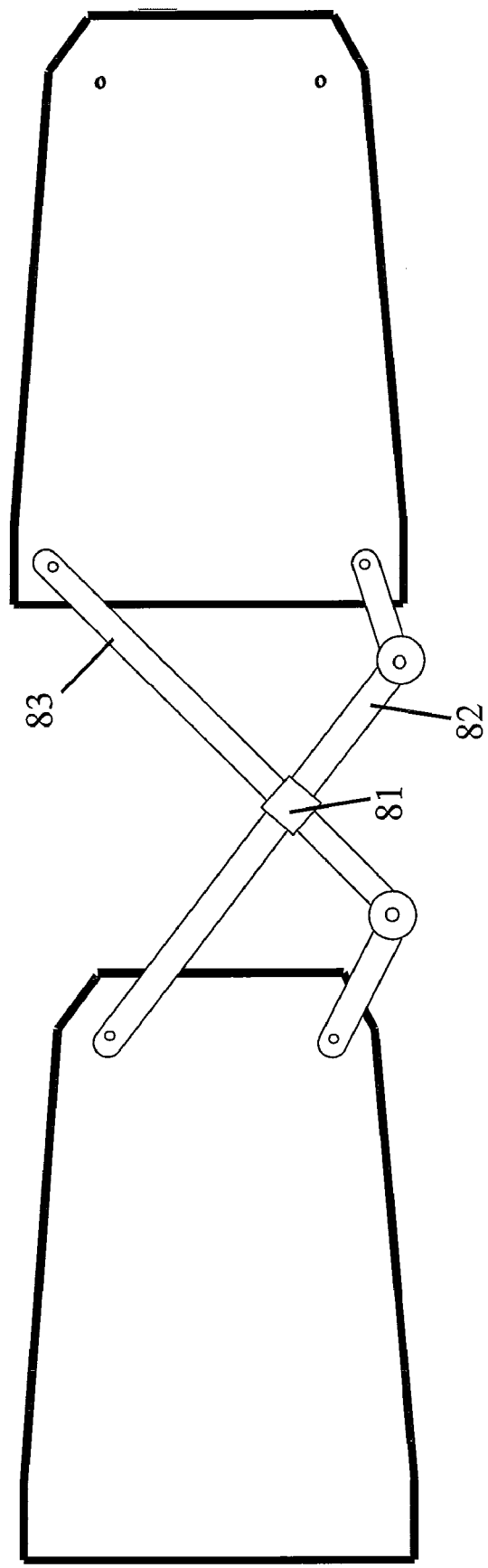
Figure 9:
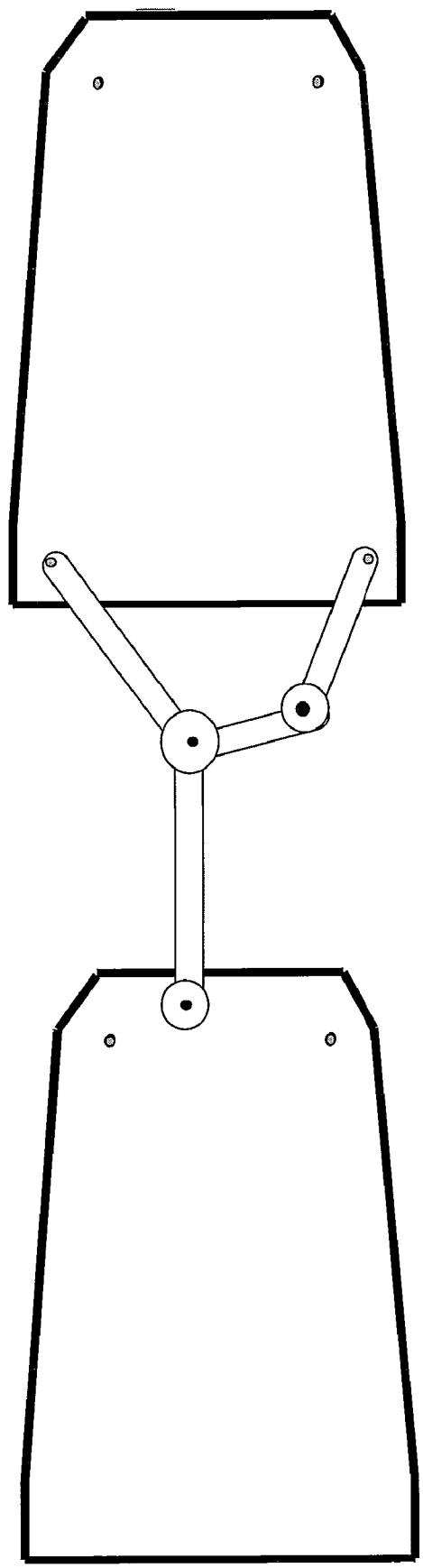
Figure 10:
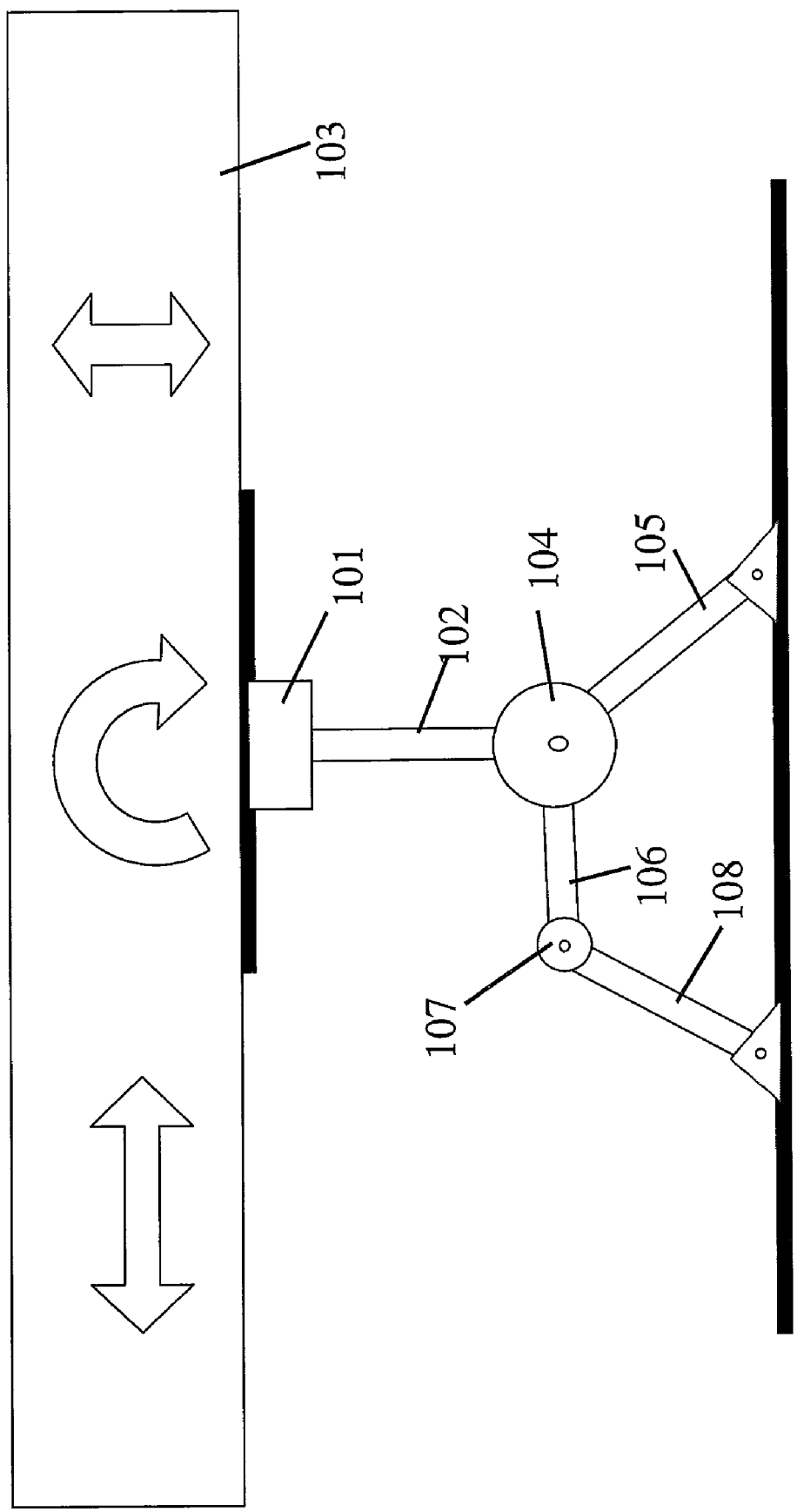
Figure 11:
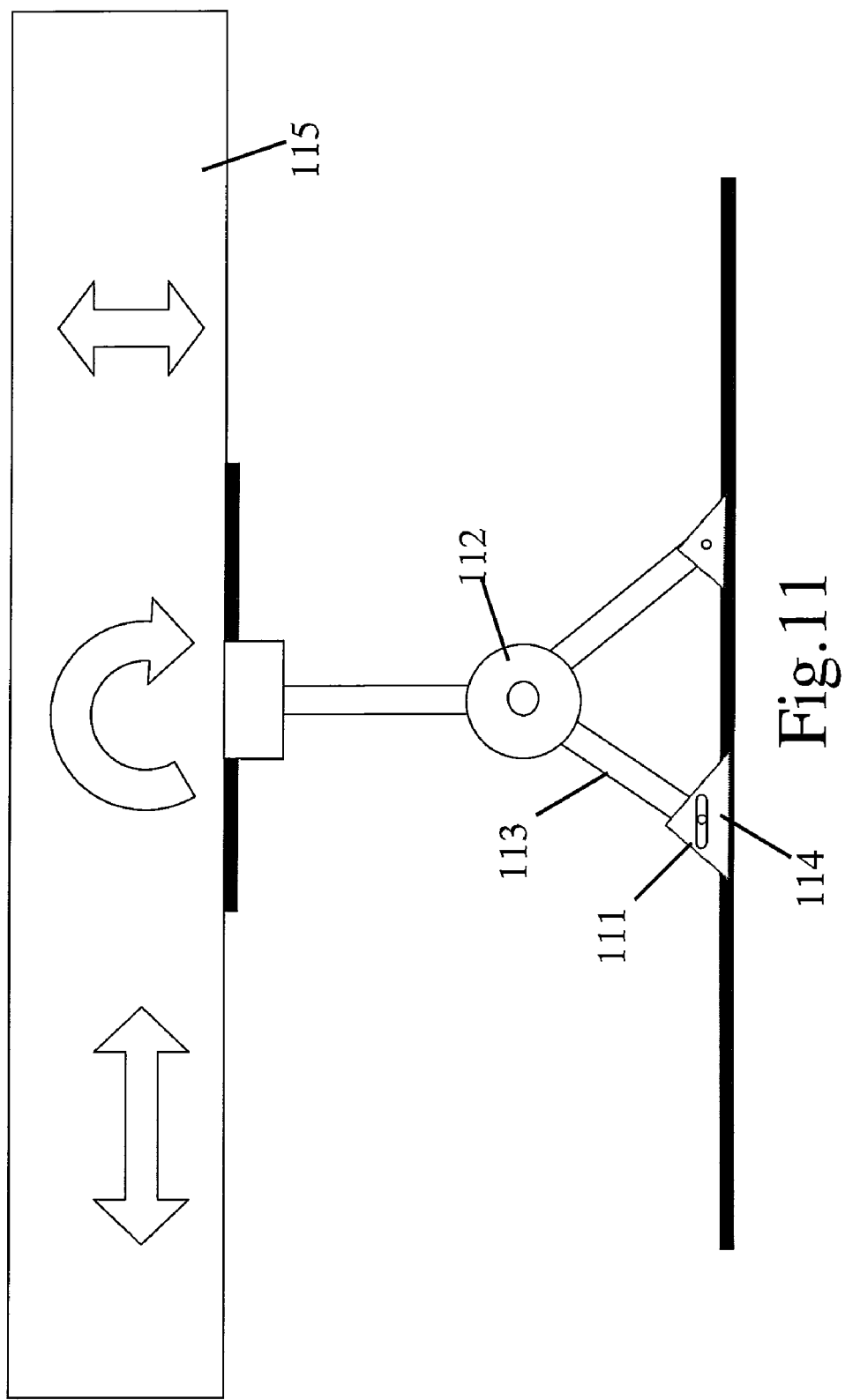
Figure 12:
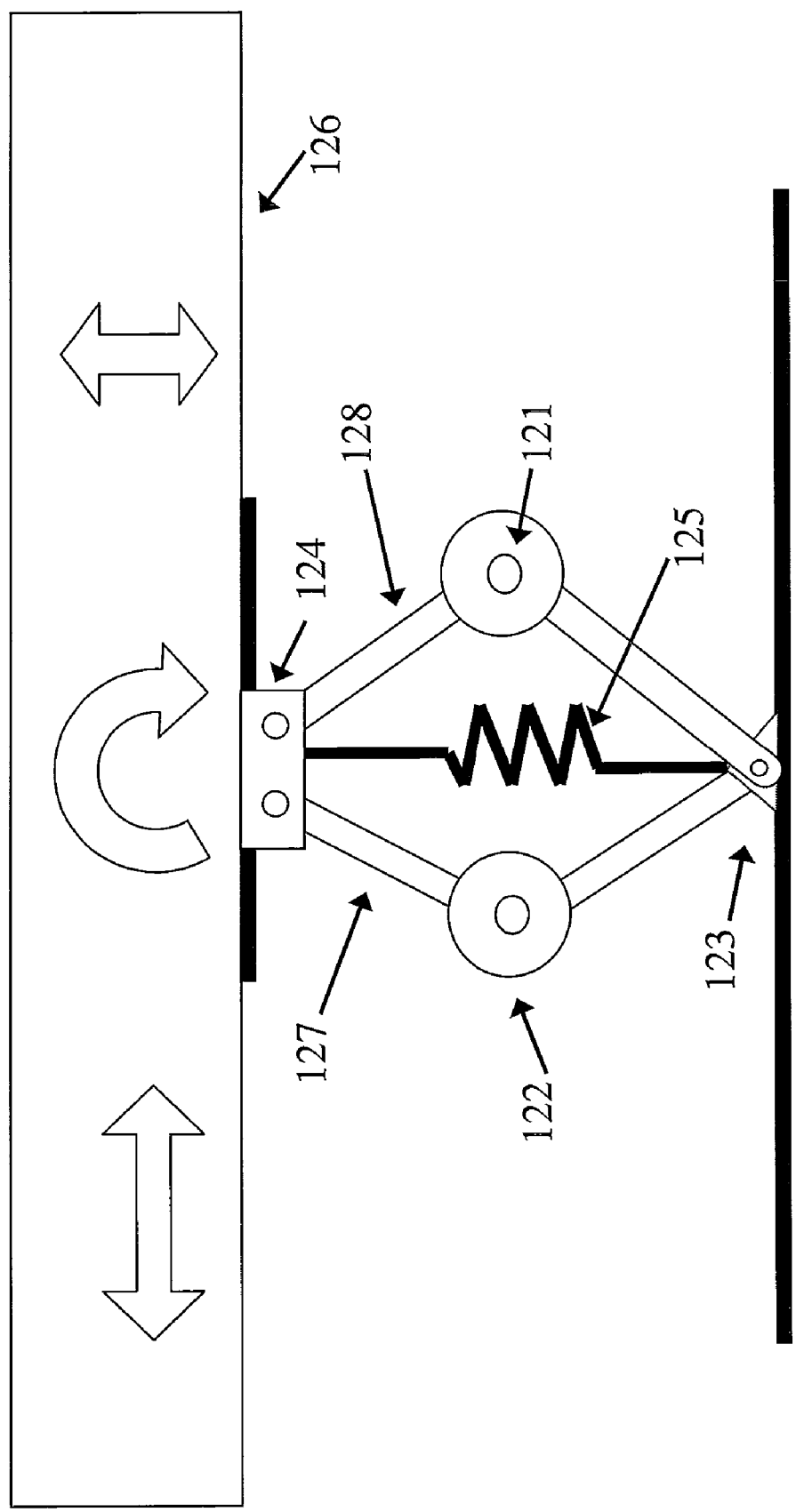
Figure 13:
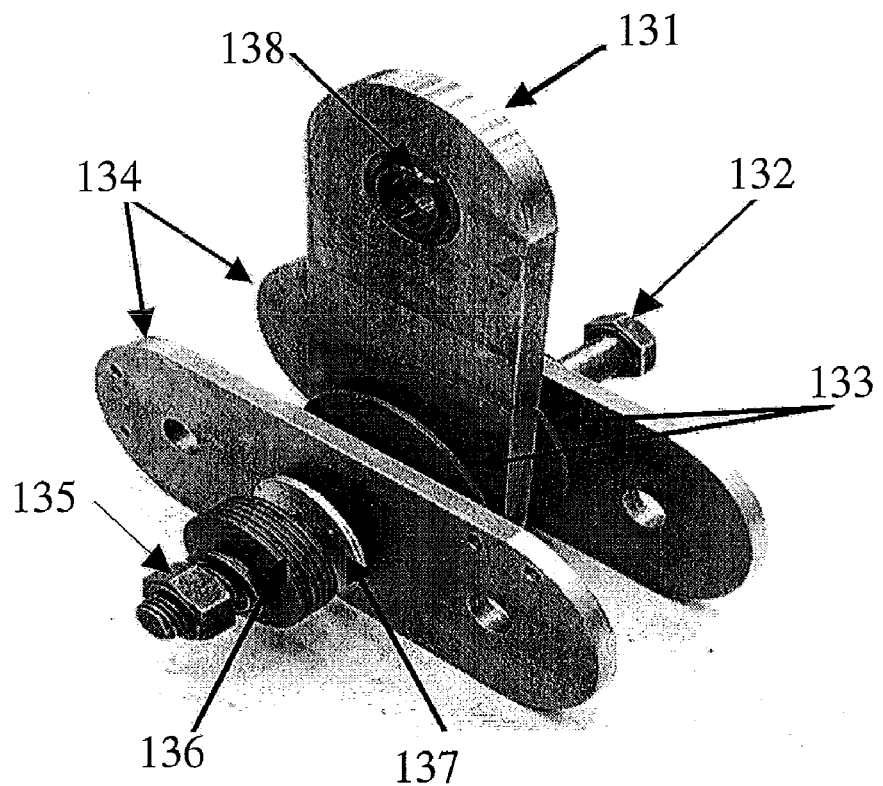
Figure 14:
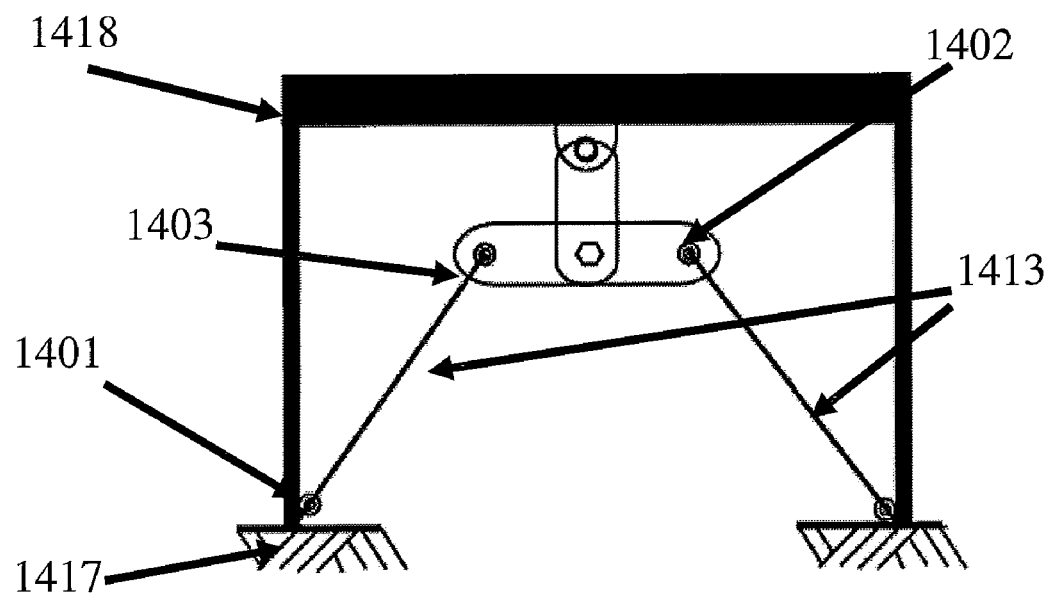
Figure 15:
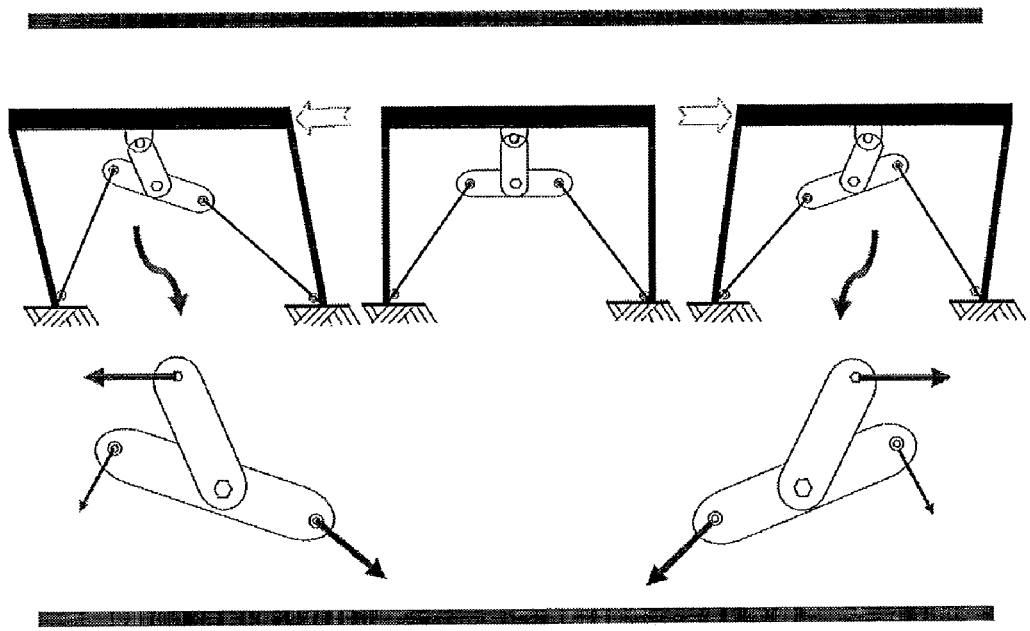
Figure 16:
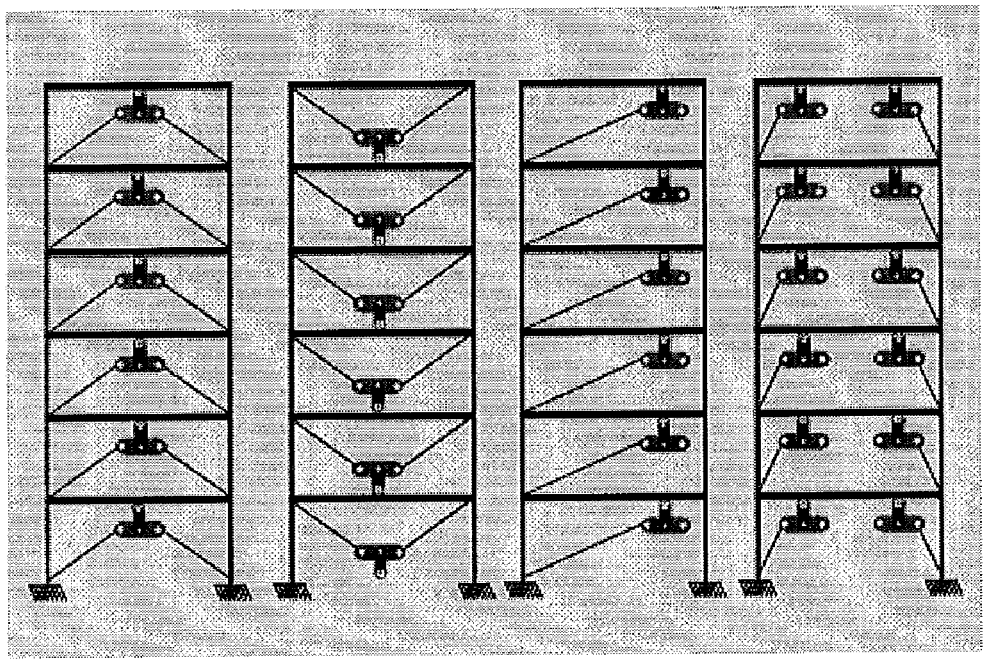
Figure 17A:
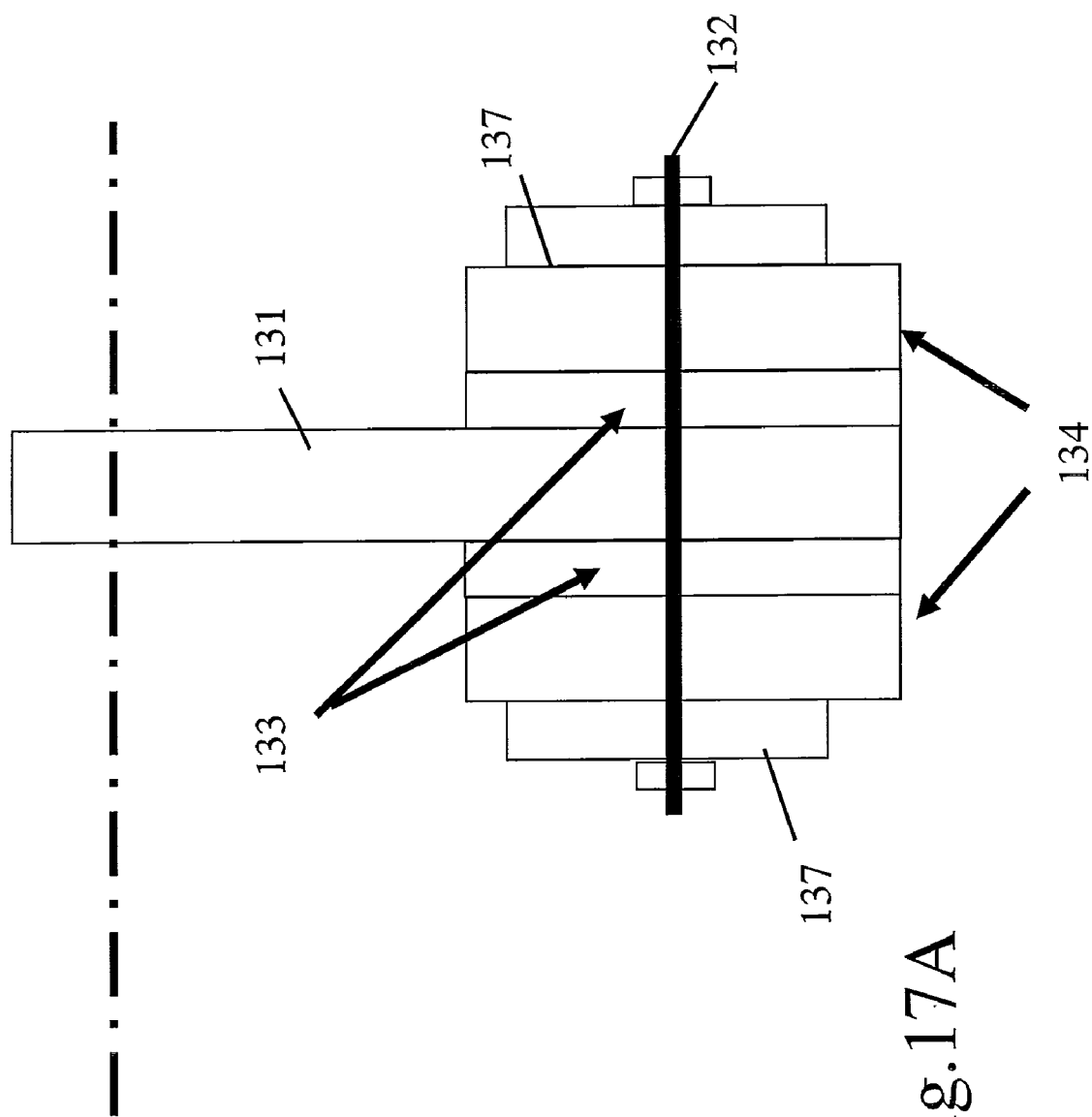
Figure 17B:
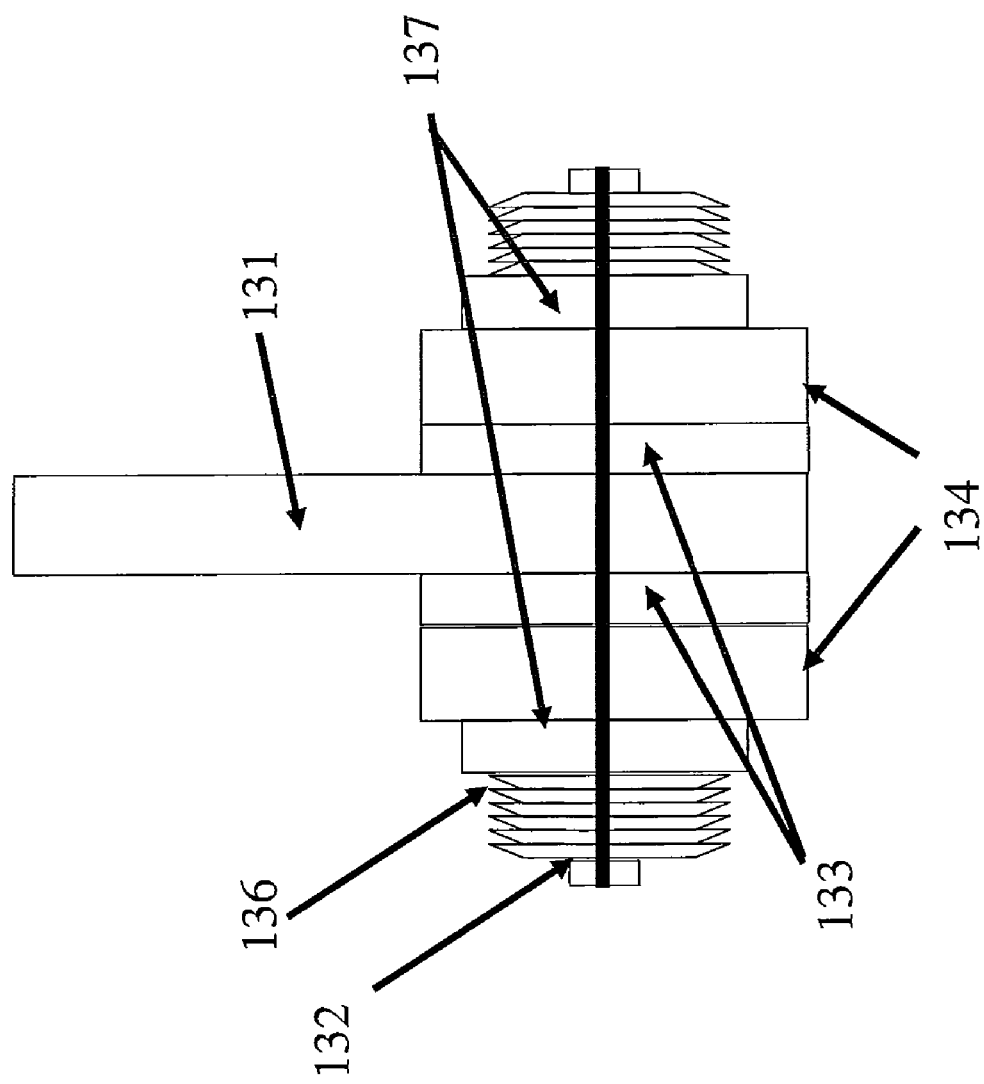
Figure 18:
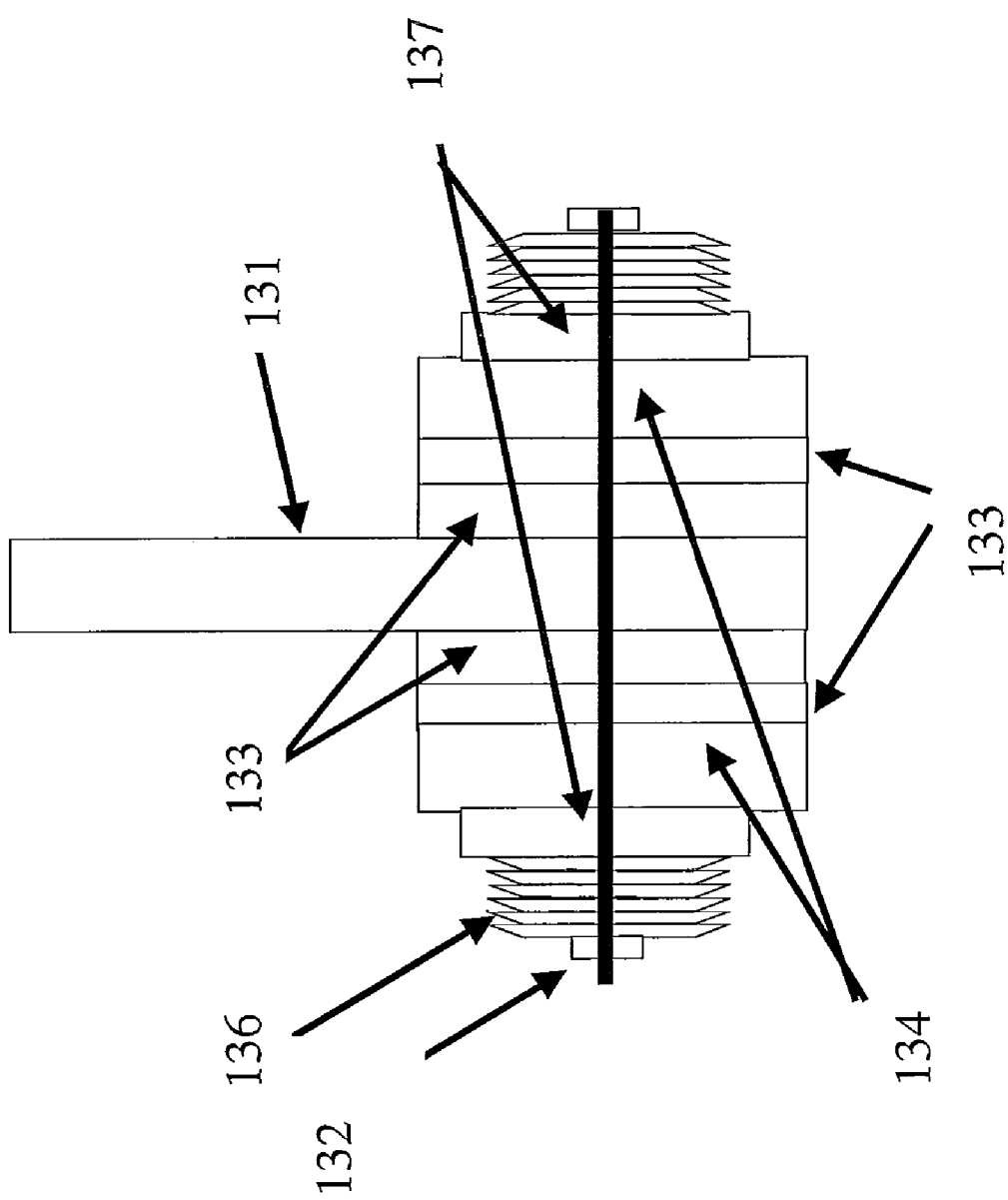
Figure 19:
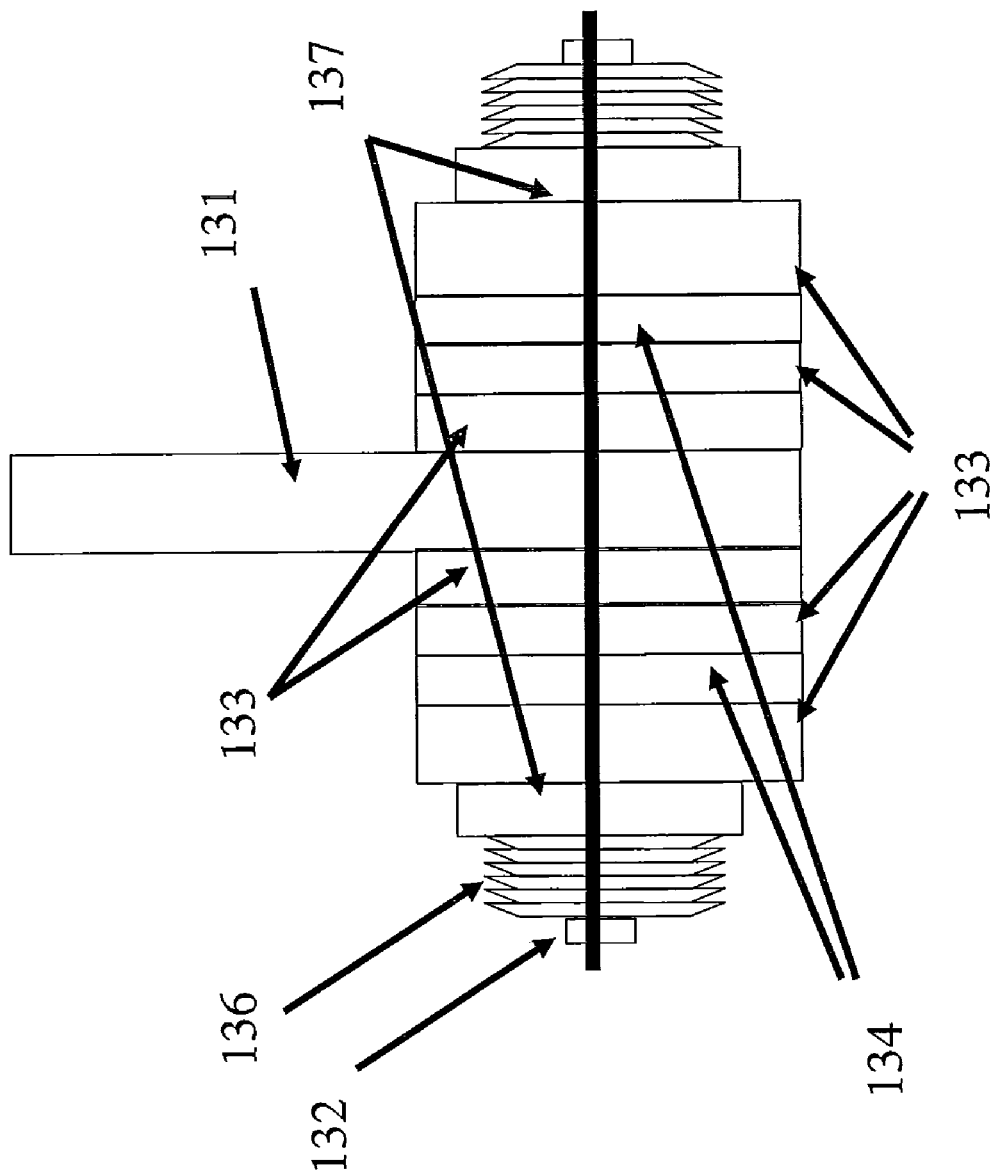
Figure 20:
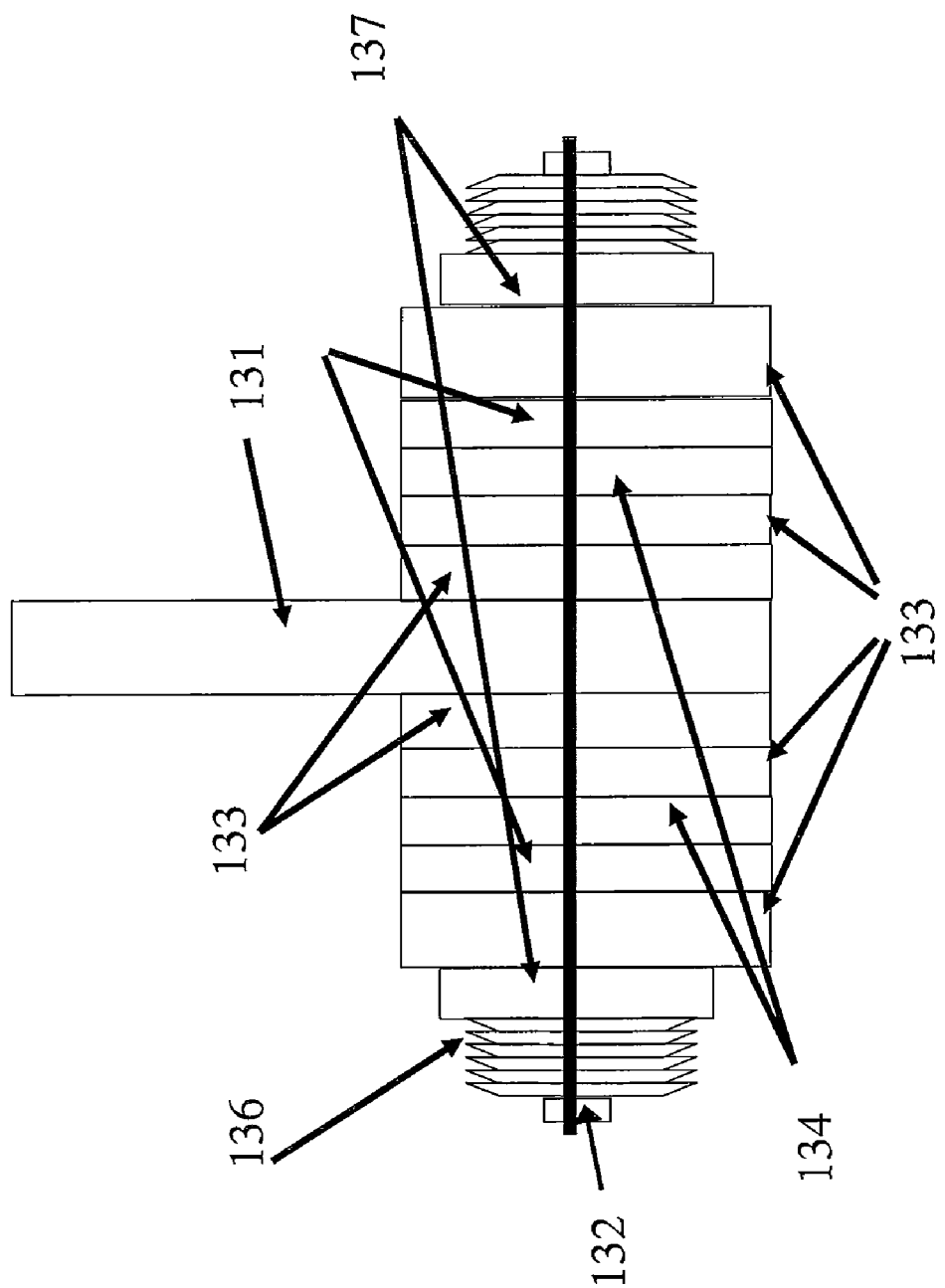
Figure 21:
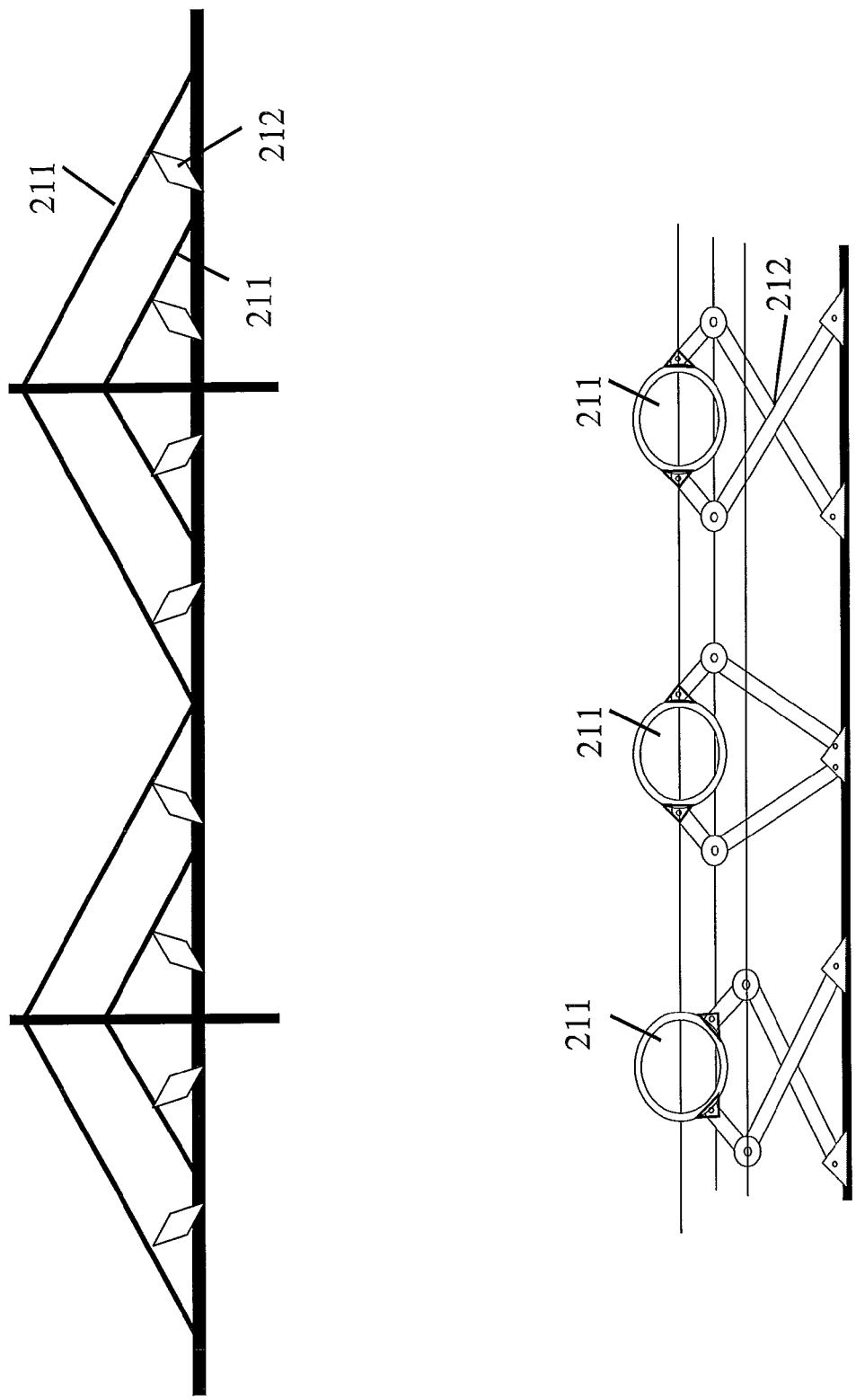
Figure 24:
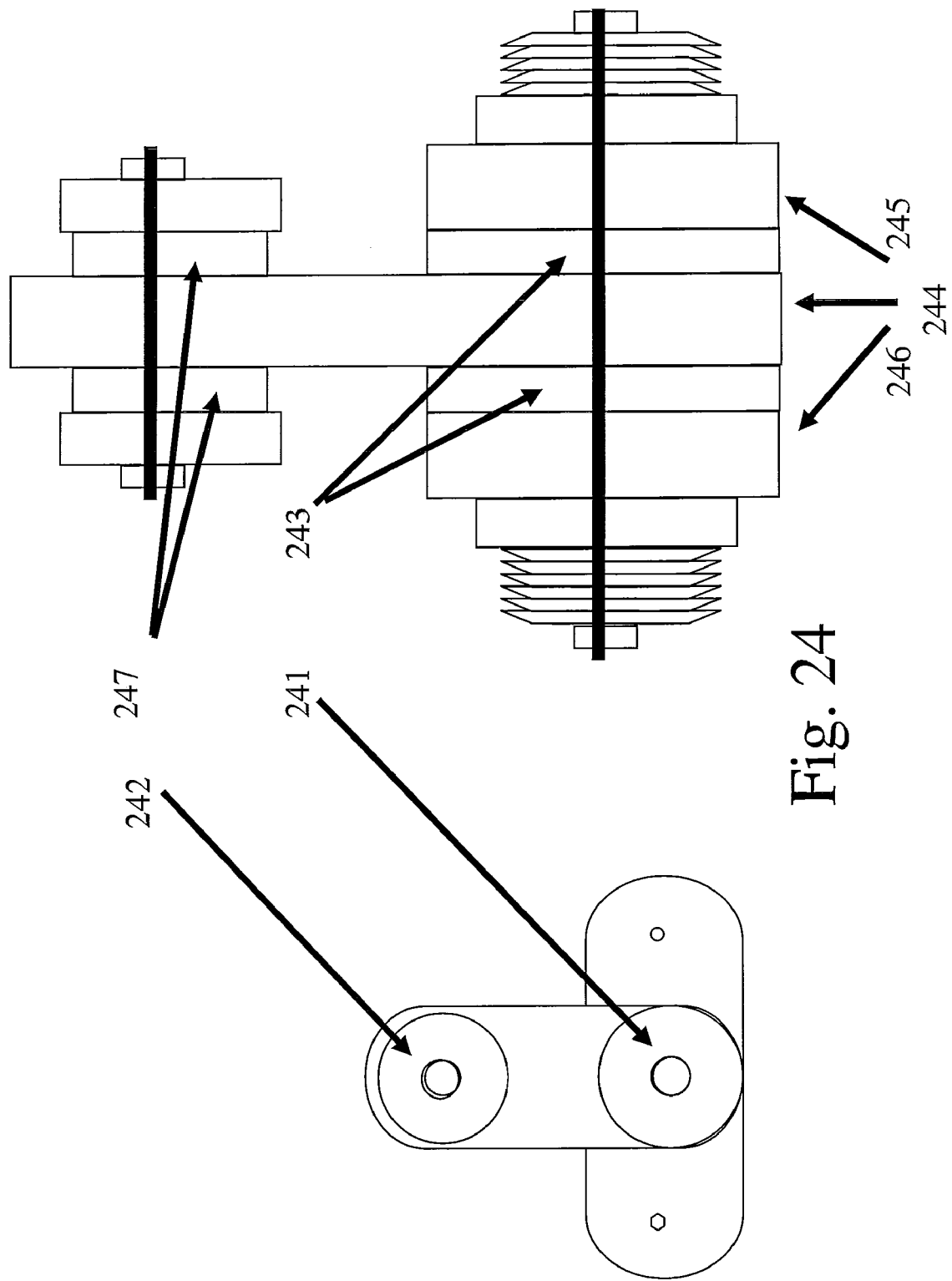

A preferred embodiment of the invention will now be described in details with reference to the drawing in which FIG. 1 shows a device for base isolation the device comprising four dampers, FIG. 2 shows a side view of a system with a damper connecting a structural system to a foundation, FIG. 3 and FIG. 4 show the mechanism of the dampers when the base is rotating because of torsion, FIG. 5 shows a side view of a system similar to the one shown in FIG. 1 including a spring for holding the first structural member in an original position wherein the first and second structural members are in a mutual position above each other, FIG. 6 shows a specific configuration of the device for dampening movement of a machine, FIGS. 7, 8 and 9 shows three alternative embodiments of the device shown in FIG. 6, FIG. 10 shows an embodiment of the device comprising a sliding member, FIGS. 11 and 12 shows alternative embodiments of the device shown in FIG. 10, FIG. 13 is a perspective picture of a friction damper device according to the present invention, FIG. 14 shows a steel frame with a friction damper device, FIG. 15 shows the mechanism of the damper for dampening movement of a frame, FIG. 16 shows the flexibility of using the friction damper in different types of bracing systems, FIG. 17 shows a damper with to side members and a central plate and two pieces of a visco-elastic material, FIG. 18 shows the damper of FIG. 17, including two pieces of a friction material, FIG. 19 shows the damper of FIG. 18, further including two pieces of a third material, e.g. a disc made of brass, FIG. 20 shows the damper of FIG. 18, further including two pieces of a piezoelectric material, FIG. 21 shows the damper device used in a cable stay bridge, FIG. 22. shows a damper for dampening pounding, FIG. 23 shows a damper for dampening rectangular panels, and FIG. 24 shows a damper wherein a dampening member of a friction material is arranged in one rotational joint and a dampening member of a visco-elastic material is arranged in another joint.

As shown in FIGS. 1 and 2, the device according to the present invention comprises a first structural member 1 and a second structural member 2. The first member is rotationally joined to at least two elements 7 of a first group of elements (in FIG. 2, only one of these elements is shown). The second structural member is also rotationally joined to at least two elements of a second group of elements 4 (in FIG. 2, only one of these elements is shown). The elements of the first group of elements are individually joined to an element of the second group of elements in rotational joints 6. In at least one and preferably in each of the joints, the parts are clamped together by clamping means, e.g. a bolt 8 extending throughout both parts of the joint.

In one of the joints or in each of the joint, a dampening member 3, 5 may be arranged for dampening the movement of one of the parts in relation to the other of the parts of the joint. The dampening member 3,5 can be a piece of a material adapted to reduce the ability of one of the joint-parts to move in relation to the other part of the joint. As an example, a piece of a rubber material arranged between the two parts of the joint and in contact with both parts. Preferably, the dampening member is either a piece of a friction material, e.g. an asbestos containing material known from brakes or clutches or the member is a piece of a visco-elastic material, e.g. a relatively thick and soft silicone pad arranged between the two parts, e.g. adhesively bonded to one or both of the parts. Moreover, the dampening member may comprise one or more pieces of both types of material, e.g. a sandwich construction with one or more layers of a visco-elastic material and one or more layers of a friction material. The dampening member may also be made from a material which is visco-elastic and which on its surfaces has a high surface friction, i.e. a combination between a visco-elastic material and a friction material.

The damper can be arranged in different ways. As seen in FIG. 1, the damper may have not only 2 but up to 4 or even more sets of rotational, frictional or visco-elastic joints or dampers 11, one on each of the sides of the rigid structures 1,10. Each set of joints comprising at least one joint between an element and the first structure, one joint between another element and the second structure and finally, one joint connecting the two elements. According to another preferred embodiment, the damper may have a number of frictional or visco-elastic dampers arranged on each side of the rigid structures or at least on some of the sides of the rigid structures. As an example it may be an advantage to provide 4 frictional dampers along two of the four sides of the rigid structures, 2 along each side. In this way, space will be saved on the other 2 of the 4 sides of the rigid structures. There may even be provided 2 or more rotational dampers along each of the 4 sides of the rigid structures.

In FIG. 2 the device is shown in a side view. The device is provided with a first and a second structural member 1,2. The first structural member is 4, 7. The first structural member 1 is attached by a rotational joint 8 to the element 7 of a first group of elements, which element in the joint 6 is connected to an element of the second group of elements. The elements of the first group of elements and/or the hinge pins of the rotational joints 8 may be made from steel or any other suitable material such as carbon fibres composite materials including polyester or epoxy resins or from ceramics. The structural members 1,2 is connected to respective parts of a building structure to be dampened, e.g. to the foundation and the first level of the building respectively, so that the entire building is allowed to move in the horizontal plane. The elements 4,7 are interconnected in a joint with the hinge pin 6. When the structural element (or building) 10 moves, the movement will cause that the elements 4,7 to rotate against each other in mutually opposite directions around the hinge pin. In the joint, the dampening member 3 will cause a frictional or a visco-elastic resistance against the movement and thus dampen the movement of the building 10. The device may further have any number of dampening members, e.g. in the form of circular disc shims 3,5 of friction pad material or visco-elastic material placed between the parts of the rotational joints. The friction or visco-elastic pads are ensuring stable frictional or visco-elastic force acting on the joint-parts. Friction pad material or visco-elastic material may further be placed in one or both of the rotational joints connecting the elements of the first and second group 4,7 respectively to the first and second structural members 1,2.

In a preferred embodiment of the invention the damper comprise two elements, each one of them connected to a separate platform. As seen in FIG. 2 the element 7 is pivotally connected via a pin 8 to the first structural member 1 and thereby e.g. to the foundation of a building. The dampening member 5 reduces the ability of the element to rotate in relation to the first structural member. Additional elements could be arranged in serial with the element 5 or instead of the element 5, e.g. for adjusting the height of the element 7 and thereby the height of the second structural element in relation to the first structural element.

Similarly, the element 4 is pivotally connected via pin 8 to the second structural element 2 through the member 5.

The joint 6 may be provided with a hinge pin, e.g. a bolt, connecting the plates 4 and 7. The bolt may preferably be a pretension bolt.

Several disc spring washers could be inserted between the head or the nut of the bolt of joint 6 and one of the respective elements 4 and 7. The disc spring washers will ensure constant pressure on the friction pads and thus a relatively constant counter force against mutual rotation of the parts of the joints.

The first and second structural members should preferably be strongly rigid structures. They can slide on each other by different types of sliders and isolators 9. As sliding or isolating material rubber, steel, metal or ball bearings may be used. It can also be any solid block that can move or slide. According to one layout, the second structural member 2 slides on the first structural member 1 via a ball bearing with an upwardly extending free ball surface, the ball being arranged in a bearing attached to the first structural member and being allowed freely to roll. The second structural member is provided with a parabolic surface defining an upwardly extending dome shape in which the ball may support the second structural member 2. If the second structural member 2 is off-set in relation to the first structural member 1, the When designing a damper for a specific purpose, it should taken into consideration that there is a relationship between the size of the horizontal movement of the rigid structures and the rotational movement of the rotational dampers. Preferably the damper should designed so that even very small horizontal movements of the rigid structures effects considerable rotational movement of the rotational damper or dampers and thus enables the damper or dampers to dissipate as much energy as possible. By making the elements 4 and 7 as short as possible, the best possible relationship between the horizontal movement of the rigid structures and the rotational movement of the rotational dampers may be achieved and thereby most energy will be dissipated.

FIGS. 3 and 4 shows two different situations wherein the system is displaced from the unloaded "original" position of FIG. 1.

FIG. 5 shows a side view of a system similar to the one shown in FIG. 1. The system comprises two structural members in the form of two quadrangular frames. The two frames are connected via a number of rotational joints. The rotational joints are provided with a number of disc springs 51 arranged to ensure a constant clamping pressure against the dampening members. In order to allow the one frame to move in relation to the other frame, and yet to ensure, that the frames, over time, stays at least substantially on top of each other in an "original" mutual position, the structural members 1,2 are biased towards the "original" position by means of one or more strong springs 52 forcing the structural members towards the "original position".

FIG. 6 shows a configuration of the device, wherein the first structural member 61 is comprised in a heavy foundation block 62 and wherein the second structural member 63 is comprised in a foundation for a centrifugal machine 64, i.e. a machine with the need for dampening vibrations. As shown, the first structural member 61 is joined to a first and a second element 65, 66 via first and second rotational joints 67, 68. The first element 65 is again joined to a third element 69 via a third rotational joint 70. The second element 66 is joined to the third element in a fourth rotational joint 71. The second structural member 63 is joined to fourth and fifth elements 72,73, which elements are interconnected in a fifth rotational joint 74. The fifth rotational joint and the fourth rotational joints are interconnected by a sixth element 75. As indicated in FIG. 6, the device allows the centrifugal machine to move in all directions of a horizontal plane. Frictional and/or visco-elastic resistance in the joints will dampen movement in any direction.

FIGS. 7 and 8 shows two alternative embodiments of the device shown in FIG. 6. In both Figs, the sliding member 81 is provided to provided either frictional and/or visco-elastic resistance against sliding between the two elements 82, 83. FIG. 9 shows a simpler embodiment of the device shown in FIG. 6 with a reduced number of rotational joints and elements.

FIG. 10 shows an embodiment of the device, wherein the rigid joint 101 connects the element 102 with the structure, e.g. a machine, 103 to be dampened. The rotational joints 104 and 107 are provided to dampen mutual movement between the respective elements—the joint 104 dampens movement between element 105, 106 and 102, whereas the joint 107 dampens movement between the elements 106 and 108. The joints 104 and 107 may be provided with a dampening member for provision of a friction and/or visco-elastic resistance. The system may be provided additionally with a spring or a set springs allowing the structure 103 to return after displacement to its original position. The spring or set of springs may be provided either between the structure 103 and a fixed point of the surroundings, e.g. a point of the foundation or the spring or set of springs may be provided integrated into one or both of the rotational joints 104 an 107.

FIG. 11 shows an alternative embodiment of the device shown in FIG. 10. In this embodiment, horizontal movement of the machine is dampened by friction and/or by visco-elastic resistance in joint 112. In the combined linear and rotational joint 111, the element 113 is allowed to slide horizontally and rotate around the hinge pin 114. The system may be provided additionally with a spring or a set springs allowing the structure 115 to return after displacement to its original position. The spring or set of springs may be provided either between the structure 115 and a fixed point of the surroundings, e.g. a point of the foundation or the spring or set of springs may be provided integrated into the rotational joint 112.

FIG. 12 shows yet another embodiment of the damper shown in FIG. 10. In this assembly, the machine is dampened by two rotational joints 121,122. A spring 125 is connected between the rotational joint 123 and joint 124. Elements 127 and 128 are separately connected to joint 124 by a hinge. In order for the structure, e.g. a machine 126, not to rotate, it should preferably be supported by a plurality, e.g. 2, 3, 4 or more assemblies of the shown kind.

The remaining Figs. all shows various embodiments of a damper according to the second aspect of the present invention.

As seen in FIGS. 13 and 14, a damper according to the present invention may have a central plate 131 provided with a hole 138 for attachment of the plate e.g. to an upper frame 1418 of a structural system. The damper is further provided with two side plates 134. The side plates are also provided with holes for attaching the side plates to braces 1413. Shims of either a friction material or a visco-elastic material 133 has been arranged between the central plate 131 and the side plates 134. The bolt 132, the nut 135 and the disc springs 136 serves for applying a compressive clamping force against the pads or shims of visco-elastic or friction material. If the shims is made of a visco-elastic material, they may be glued or in any similar way fastened to the steel plates or as an alternative, the disc or discs may simply be loosely arranged between the steel plates. If the friction between the steel plates and the shim(s) is relatively high compared with the visco-elastic resistance against movement of the steel plates, it will be ensured that the movement will be visco-elastically damped before slipping between the steel plates and the visco-elastic disc(s), if slipping should occur. A washer 137 may be inserted between the side plate and the disc springs.

When the damper is installed in a structural frame, as seen in FIG. 14, it follows the horizontal motion of the frame—as seen in FIG. 15. Due to the hinge connection between the central plate and the upper column and hinge connections between the side plates and the braces 1413, again being pivotally connected to the base column 1417, the forces of the movement of the structural frame is being transferred rotationally to the dampening parts—as can be seen in FIG. 15. When the displacement of the structural frame starts, the damper will dissipate energy by means of the visco-elastic forces which starts to build up.

When the applied forces in the damper exceed the frictional forces, a sliding between the central plate and the visco-elastic or frictional shims takes place. The plates now slides in a circular movement around the hinge pin or bolt. Due to the tensile forces in the bracing a sliding between the shims of friction material and the side plates or between the shims of frictional material and the shims of a visco-elastic material also. In the sliding phase, the damper will dissipate energy by means of friction between the sliding surfaces. This phase will keep on and change to the visco-elastic phase when the load reverses its direction.

This process of moving from phase to phase is repeated upon reversal of the direction of the force application.

In order to keep a constant clamping force when the damper is in operation, one or more disc springs 136 are preferably mounted between the bolt head and the side plate, between the nut and the side plate or at both sides. The spring could be of any kind but in a preferred embodiment of the invention a combination of discs springs 136 and washers 137, such as Belleville Washers, are used. These springs are initially cone shaped annular disc springs that flatten under compression. The washers are placed in order to prevent any marks on the steel plates due to the disc springs when they are in compression The damper is based on a very simple design and comprises only parts that are easily produced. At the same time it is easy to assemble and very flexible in arrangement. As seen in FIGS. 14, 15 and 16, the damper can be arranged in different configurations as well as in different types of bracing systems.

The two side plates 134 connect the damper to a bracing system such as a Chevron bracing—as seen in FIG. 14—or similar arrangement of braces e.g. in a D shape or a K shape. The bracing system could have bars 1413 being pre-tensioned in order to prevent them from buckling due to the compression force but. However, the bracing system could also have structural members capable of absorbing compression. The braces are preferably pivotally connected at both ends 1401 and 1403, by having a simple bearings member for connecting the bracing to the damper 1402 and to the column base connection 1417, as shown in FIG. 14. The frame 1418 is the upper frame column.

The reason for, if necessary, using two side plates is to increase the frictional surface area and to provide the necessary symmetry to obtain plane behaviour of the device. All plates and the frictional pads have a centred hole for assembly with a bolt 132 with a nut 135 or similar kind of confining hinge pin. The bolt or similar hinge pin compresses the three plates 131 and 134 of the damper and the visco-elastic or frictional pads 133 in a hinge like connection. At the same time, the bolt 132 is used to control the normal force applied on the visco-elastic friction pad discs and the steel plates, whereby the dampening characteristics of the damper is being changed.

FIG. 16 shows an example of multiple unit dampers, which give the designer the ability to build a damper comprising several units. The simplicity of the damper design allows the construction of a device with multiple units, based on the requirements of the designed applied forces and the space limitations.

FIG. 17A shows a side-view of the damper of FIG. 13. The damper has a central plate 131 and two side plates 134. Between the central plate and the side plates, shims or pads of either a visco-elastic material or a friction material is arranged. The material may also be a combination between a visco-elastic material providing a frictional resistance on its surfaces.

FIG. 17B shows another embodiment of the damper of FIG. 17A, wherein a plurality of disc springs 136 have been arranged adjacent one or both of the side plates 134 or, as shown in FIG. 17B, adjacent the washer 137. The disc springs 136 are important in the case wherein the shims or pads 133 are made of a friction material or at least in the case where the shims or pads have a frictional surface characteristics being used for dampening the mutual movement between the central plate and the side plates by friction.

As seen in FIG. 18, more circular disc shims 133 of either a visco-elastic and/or a friction material may be arranged between the steel plates, e.g. the centre plate 131, and the shim(s) 133 of a visco-elastic material or between more shims of visco-elastic material. The movement thereby being damped by a combination between the visco-elastic dampening of the visco-elastic material and the friction dampening of the friction material.

The visco-elastic dampening will typically occur already for very small vibrations of the structure, whereas the friction dampening occurs as the movement becomes so strong that slipping between the shims and/or the steel plates occur.

As seen in FIG. 19, even more side-plates 134 and/or shims 133 of a third material, e.g. steel plates, may be arranged between any of the other shims of either visco-elastic material or friction material or between one of the shims and one of the steel plates. The plates are introduced in order to ensure a uniform pressure on the entire surfaces of the visco-elastic shims and/or the friction shims.

As seen in FIG. 20, even more shims 2021 of a piezoelectric material may be arranged between any of the other plates, in this case between side-plates 134 and visco-elastic shims 133. By application of an electrical voltage to the piezoelectric material, the size of those plates will change. Thereby, the pressure against the visco-elastic shims and/or the pressure against the friction shims will change and accordingly, the characteristics of the damper will change. In general, the side plates 134 and a plurality of shims either of a friction material or shims of a visco-elastic material may be arranged in any order. As an example, in the order from the central plate and towards the washer 137, the plates and discs may be as follows:

visco-elastic, friction, visco-elastic, a third material (e.g. a steel disc), and a side plate, or visco-elastic, a third material (e.g. a steel disc), friction, visco-elastic, and a side plate, or friction, visco-elastic, a third material (e.g. a steel disc), visco-elastic, and a side plate, or friction, visco-elastic, friction, a third material (e.g. a steel disc), and a side plate.

All possible combinations between material may be used depending on the desired dampening characteristics.

FIG. 21 shows the damper 212 in three different situations for dampening vibrations in bridge cables. The bridge cable 211 is connected to a fixed part of the bridge through sets of dampened rotational joints.

Figure 22:
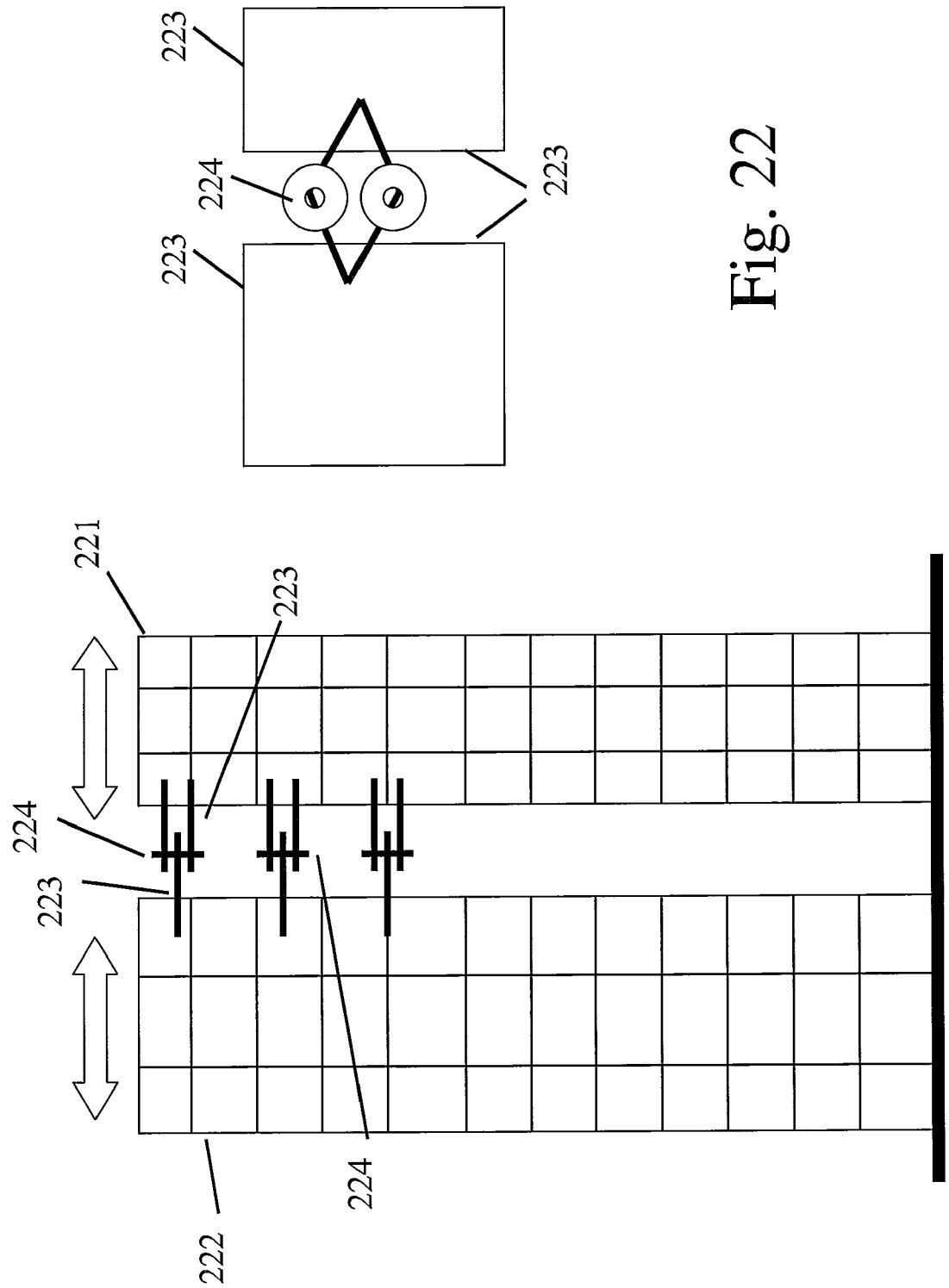

FIG. 22 shows two adjacent building structures 221, 222 being interconnected by a number of elements 223 interconnected in dampened rotational joints 224. The movement of both of the to buildings may thus be dampened. The dampening mechanism thus protects the buildings from pounding each other.

FIG. 23 shows a wall damper specifically adapted to dampen movement of small structures, e.g. houses or rigid frames such as wall panels being relatively high compared to their width, i.e. a structure having two side surfaces 231 which are relatively long compared to other side surfaces 232 of the structure. The damper 233 is provided in one or both of either the top and/or the bottom surfaces, i.e. at one or both of the end parts of the relatively long side surfaces of the structure. A plurality of such dampers may be provided in these areas of the structure. Each damper is attached to the structure 239 which could be a rigid panel or a rigid frame. The dampers thus connects the frame or panel to a surrounding frame or panel 240, via first and second rotational joints 237, 238 respectively. One or both of the rotational joints may be dampened by dampening members, e.g. a pad of a visco-elastic material or a pad of a friction material.

FIG. 24 shows a combined friction and visco-elastic damper comprising 2 dampened rotational joints 241, 242. A first of the joints 241 is dampened by a friction material 243, arranged between the centre plate 244 and the side plates 245, 246. A visco-elastic material arranged in a similar way dampens the second of the joints 242.

The invention claimed is:

1. A device for damping the relative movement of a first structural member in relation to a second structural member,
the first structural member being rotationally joined to at least two elements of a first group of elements, and
the second structural member being rotationally joined to at least two elements of a second group of elements,
wherein each of the at least four elements is joined to the structural members, respectively, by means of a joint fixating a first end of the element relatively to the structural member while allowing rotation of the element,
wherein a second end of each of the elements of the first group of elements are individually joined to a second end of an element of the second group of elements in a rotational joint, so as to form at least six rotational joints for damping relative movement between the elements of the first group of elements and the elements of the second group of elements and thus for damping the movement of the first structural member in relation to the second structural member, and
wherein at least one of said rotational joints comprises a damping member, the damping member comprising a piece of friction material so that relative rotation of the elements is dampened by friction.

2. A device according to claim 1, the device further comprising clamping means for clamping at least one of the rotational joints together, so as to maintain a clamping force between elements in the rotational joints.

3. A device according to claim 1, wherein the at least one damping member is arranged between the elements of the first group of elements and the elements of the second group of elements so as to establish contact between the elements and the damping member so that the relative movement of the elements is dampened.

4. A device according to claim 1, wherein the at least one damping member is arranged between first structural member and the elements of the first group of elements and/or the elements of the second group of elements so as to establish contact between the elements and the damping member and between the structural member and the damping member so that the relative movement of the elements in relation to the structural member is dampened.

5. A device according to claim 1, wherein the at least one damping member is arranged between the second structural member and the elements of the first group of elements and/or the elements of the second group of elements so as to establish contact between the elements and the damping member and between the structural member and the damping member so that the relative movement of the elements in relation to the structural member is dampened.

6. A device according to claim 1, further comprising a piece of a third material arranged between the at least one damping member and the elements of the first group of elements or between the at least one damping member and the elements of the second group of elements.

7. A device according to claim 1, further comprising a piece of a third material arranged between at least two damping members in at least one of the rotational joints.

8. A device according to claim 1, wherein the piece of friction material is arranged in at least one of the joints between elements of the first group of elements and elements of the second group of elements.

9. A device according to claim 2, wherein the clamping means is adapted to enable the clamping force to be varied.

10. A device according to claim 1, wherein at least one of the joints comprises a pin extending through each of the elements of the joint.

11. A device according to claim 10, comprising a bolt, at least a portion of the bolt constituting the pin, the bolt having:
a bolt element with a bolt head,
a nut with a nut head,
the clamping force being determined by the pretension of the bolt.

12. A device according to claim 11, further comprising means for maintaining a substantially constant clamping force with time.

13. A device according to claim 1, wherein the at least one damping member is arranged between at least one of the elements of at least one of the joints and at least one joint plate.

14. A device according to claim 1, wherein the piece of friction material comprises an asbestos free composite material comprising kevlar and brass.

15. A device according to claim 2, wherein the clamping force shows a variation of less than 5% in a 300 cycle test with 0.5 Hz±0.1 Hz forcing excitement frequency and a rotation amplitude of one of the at least two structural members of up to 0.2 rad at an applied excitement moment of ±1700 kN·mm and an initial clamping force of 42 kN±0.5 kN.

16. A device according to claim 1, being adapted so that a substantially linear relationship between displacement amplitude of one of the at least two structural members and energy dissipation in the joints, is provided.

* * * * *